US011791966B2

(12) United States Patent
Elshafie et al.

(10) Patent No.: US 11,791,966 B2
(45) Date of Patent: Oct. 17, 2023

(54) TECHNIQUES FOR REPORTING CHANNEL STATE INFORMATION PERIODICITY

(71) Applicant: QUALCOMM Incorporated, San Diego, CA (US)

(72) Inventors: Ahmed Elshafie, San Diego, CA (US); Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/471,427

(22) Filed: Sep. 10, 2021

(65) Prior Publication Data
US 2023/0081579 A1 Mar. 16, 2023

(51) Int. Cl.
*H04L 5/00* (2006.01)

(52) U.S. Cl.
CPC .......... *H04L 5/0053* (2013.01); *H04L 5/0048* (2013.01)

(58) Field of Classification Search
CPC ....................... H04L 5/0053; H04L 5/0048
See application file for complete search history.

(56) References Cited

U.S. PATENT DOCUMENTS

| | | | |
|---|---|---|---|
| 2016/0143055 A1 | 5/2016 | Nammi et al. | |
| 2017/0311188 A1* | 10/2017 | Sun | H04L 5/0048 |
| 2018/0062811 A1* | 3/2018 | Akkarakaran | H04L 5/0007 |
| 2019/0053288 A1* | 2/2019 | Zhou | H04B 7/0626 |
| 2020/0112355 A1 | 4/2020 | Park et al. | |
| 2021/0258940 A1* | 8/2021 | Kim | H04L 5/0051 |
| 2022/0240208 A1* | 7/2022 | Chien | H04W 56/0045 |
| 2022/0278802 A1* | 9/2022 | Noh | H04L 5/0053 |

OTHER PUBLICATIONS

International Search Report and Written Opinion—PCT/US2022/041259—ISA/EPO—dated Nov. 29, 2022.

* cited by examiner

*Primary Examiner* — Ronald B Abelson
(74) *Attorney, Agent, or Firm* — Holland & Hart LLP

(57) ABSTRACT

Methods, systems, and devices for wireless communications are described. A user equipment (UE) configured for a periodic channel stat information (CSI) reference signal (CSI-RS) configuration may request an update for one or more parameters of the periodic CSI-RS configuration. For example, the UE may transmit request to a base station for a longer periodicity based on detecting a low Doppler scenario or little variance to wireless channel conditions, or the UE may request a shorter periodicity based on detecting a high Doppler scenario or high variance to wireless channel conditions. The base station may update a configuration for CSI or for CSI-RS based on the request. For example, the base station may update a periodicity for the periodic CSI-RS configuration based on the requested periodicity.

28 Claims, 16 Drawing Sheets

TECHNIQUES FOR REPORTING CHANNEL STATE INFORMATION PERIODICITY

FIELD OF TECHNOLOGY

The following relates to wireless communications, including techniques for reporting channel state information periodicity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured to periodically receive channel state information (CSI) reference signals (CSI-RS) and transmit a CSI report to a base station. The CSI report may indicate channel characteristics for a downlink wireless channel when the UE measured the CSI-RS. However, if the channel characteristics change between when the UE measures the CSI-RS and the base station transmits signaling based on the CSI report, the CSI report may be out-of-date or aged. Therefore, some techniques for CSI reporting may be deficient.

SUMMARY

The described techniques relate to improved methods, systems, devices, and apparatuses that support techniques for reporting channel state information (CSI) periodicity. Generally, the described techniques provide for updating one or more parameters of a CSI configuration or a CSI reference signal (CSI-RS) configuration. Methods, systems, and devices for wireless communications are described. A user equipment (UE) may be configured to report CSI to a base station. For example, the UE may be configured for a periodic CSI-RS configuration, or the UE may be configured to be triggered for aperiodic or semi-persistent CSI reports. The UE may transmit a request to a base station to update one or more parameters for CSI reporting or the periodic CSI-RS configuration. For example, the UE may transmit a request to the base station to update a periodicity of the periodic CSI-RS configuration. In some cases, the UE may detect a low Doppler scenario, or the UE may detect little variance to channel conditions or interference levels, and the UE may transmit the request indicating a longer periodicity for the periodic CSI-RS configuration. In some cases, the UE may detect a higher Doppler scenario or high variance to the channel characteristics of the wireless channel, and the UE may request a shorter periodicity. The base station may update a configuration for CSI or for CSI-RS based on the request. For example, the base station may update a periodicity for the periodic CSI-RS configuration based on the requested periodicity. Additionally, or alternatively, the base station may trigger more or fewer aperiodic CSI reports for the UE based on the request.

A method for wireless communication at a UE is described. The method may include receiving, from a base station, one or more CSI-RSs according to a periodic CSI-RS configuration identifying a first value for one or more parameters, transmitting, to the base station, a request to update the one or more parameters of the periodic CSI-RS configuration based on the received one or more periodic CSI-RSs, and receiving, from the base station at least in part in response to the request, control signaling indicating a second value for the one or more parameters of the periodic CSI-RS configuration, the second value different from the first value for the one or more parameters.

An apparatus for wireless communication at a UE is described. The apparatus may include a processor, memory coupled with the processor, and instructions stored in the memory. The instructions may be executable by the processor to cause the apparatus to receive, from a base station, one or more CSI-RSs according to a periodic CSI-RS configuration identifying a first value for one or more parameters, transmit, to the base station, a request to update the one or more parameters of the periodic CSI-RS configuration based on the received one or more periodic CSI-RSs, and receive, from the base station at least in part in response to the request, control signaling indicating a second value for the one or more parameters of the periodic CSI-RS configuration, the second value different from the first value for the one or more parameters.

Another apparatus for wireless communication at a UE is described. The apparatus may include means for receiving, from a base station, one or more CSI-RSs according to a periodic CSI-RS configuration identifying a first value for one or more parameters, means for transmitting, to the base station, a request to update the one or more parameters of the periodic CSI-RS configuration based on the received one or more periodic CSI-RSs, and means for receiving, from the base station at least in part in response to the request, control signaling indicating a second value for the one or more parameters of the periodic CSI-RS configuration, the second value different from the first value for the one or more parameters.

A non-transitory computer-readable medium storing code for wireless communication at a UE is described. The code may include instructions executable by a processor to receive, from a base station, one or more CSI-RSs according to a periodic CSI-RS configuration identifying a first value for one or more parameters, transmit, to the base station, a request to update the one or more parameters of the periodic CSI-RS configuration based on the received one or more periodic CSI-RSs, and receive, from the base station at least in part in response to the request, control signaling indicating a second value for the one or more parameters of the periodic CSI-RS configuration, the second value different from the first value for the one or more parameters.

In some examples of the method, apparatuses, and non-transitory computer-readable medium described herein, transmitting the request to update the one or more parameters may include operations, features, means, or instructions for transmitting the request to update the first value of a periodicity parameter of the one or more periodicity parameters for the periodic CSI-RS configuration, where the control signaling indicates the second value for the periodicity parameter.

Some examples of the method, apparatuses, and non-transitory computer-readable medium described herein may further include operations, features, means, or instructions for determining the periodicity value based on a Doppler spread, a delay spread, a Doppler shift, channel characteristics of a wireless channel between the UE and the base station, an interference time and frequency pattern on the wireless channel, a time and frequency coherency of the wireless channel, or any combination thereof.

In some examples of the method, apparatuses, and non-transitory computer-readable medium described herein, transmitting the request to update the one or more parameters may include operations, features, means, or instructions for transmitting the request to update a first periodicity parameter of the one or more periodicity parameters for the periodic CSI-RS configuration and the first value of a second periodicity parameter for the periodic CSI-RS configuration, where the control signaling indicates the second value for the first periodicity parameter and the second value for the second periodicity parameter.

In some examples of the method, apparatuses, and non-transitory computer-readable medium described herein, the first periodicity parameter may be associated with CSI-RSs used for channel tracking, and the second periodicity parameter may be associated with CSI-RSs used for interference tracking.

In some examples of the method, apparatuses, and non-transitory computer-readable medium described herein, transmitting the request to update the one or more parameters may include operations, features, means, or instructions for determining, by the UE, an average periodicity for the periodic CSI-RS configuration and a variance for the average periodicity based on a set of multiple estimated periodicities for the periodic CSI-RS configuration and transmitting the request indicating the determined average periodicity and the variance for the average periodicity.

Some examples of the method, apparatuses, and non-transitory computer-readable medium described herein may further include operations, features, means, or instructions for determining a first average periodicity associated with CSI-RSs used for channel tracking and a second average periodicity associated with CSI-RSs used for interference tracking.

In some examples of the method, apparatuses, and non-transitory computer-readable medium described herein, transmitting the request to update the one or more parameters may include operations, features, means, or instructions for transmitting the request to update a reference signal density parameter of the one or more periodicity parameters for the periodic CSI-RS configuration, where the control signaling indicates the second value for the reference signal density parameter.

Some examples of the method, apparatuses, and non-transitory computer-readable medium described herein may further include operations, features, means, or instructions for determining, by the UE, the reference signal density based on a Doppler spread, a delay spread, a Doppler shift, channel characteristics of a wireless channel between the UE and the base station, an interference time and frequency pattern on the wireless channel, a time and frequency coherency of the wireless channel, or any combination thereof.

Some examples of the method, apparatuses, and non-transitory computer-readable medium described herein may further include operations, features, means, or instructions for transmitting, to the base station, an indication of a latest slot associated with observed interference on a wireless channel between the UE and the base station.

Some examples of the method, apparatuses, and non-transitory computer-readable medium described herein may further include operations, features, means, or instructions for transmitting an indication of a set of multiple slots associated with observed interference on the wireless channel.

Some examples of the method, apparatuses, and non-transitory computer-readable medium described herein may further include operations, features, means, or instructions for receiving, from the base station, an indication of a quantity of slots for observed interference reporting, where the set of multiple slots corresponds to the quantity of slots.

In some examples of the method, apparatuses, and non-transitory computer-readable medium described herein, receiving the control signaling indicating the second value may include operations, features, means, or instructions for receiving, in the control signaling, an indication of the second value for a periodicity for the periodic CSI-RS configuration, or a reference signal density for the periodic CSI-RS configuration, or any combination thereof.

A method for wireless communication at a base station is described. The method may include transmitting, to a UE, one or more CSI-RSs according to a periodic CSI-RS configuration identifying a first value for one or more parameters, receiving, from the UE, a request to update the one or more parameters of the periodic CSI-RS configuration based on the transmitted one or more periodic CSI-RSs, and transmitting, to the UE based at least in part in response to the request, control signaling indicating a second value for the one or more parameters of the periodic CSI-RS configuration, the second value different from the first value for the one or more parameters.

An apparatus for wireless communication at a base station is described. The apparatus may include a processor, memory coupled with the processor, and instructions stored in the memory. The instructions may be executable by the processor to cause the apparatus to transmit, to a UE, one or more CSI-RSs according to a periodic CSI-RS configuration identifying a first value for one or more parameters, receive, from the UE, a request to update the one or more parameters of the periodic CSI-RS configuration based on the transmitted one or more periodic CSI-RSs, and transmit, to the UE based at least in part in response to the request, control signaling indicating a second value for the one or more parameters of the periodic CSI-RS configuration, the second value different from the first value for the one or more parameters.

Another apparatus for wireless communication at a base station is described. The apparatus may include means for transmitting, to a UE, one or more CSI-RSs according to a periodic CSI-RS configuration identifying a first value for one or more parameters, means for receiving, from the UE, a request to update the one or more parameters of the periodic CSI-RS configuration based on the transmitted one or more periodic CSI-RSs, and means for transmitting, to the UE based at least in part in response to the request, control signaling indicating a second value for the one or more parameters of the periodic CSI-RS configuration, the second value different from the first value for the one or more parameters.

A non-transitory computer-readable medium storing code for wireless communication at a base station is described. The code may include instructions executable by a processor to transmit, to a UE, one or more CSI-RSs according to a periodic CSI-RS configuration identifying a first value for one or more parameters, receive, from the UE, a request to update the one or more parameters of the periodic CSI-RS configuration based on the transmitted one or more periodic CSI-RSs, and transmit, to the UE based at least in part in response to the request, control signaling indicating a second value for the one or more parameters of the periodic CSI-RS configuration, the second value different from the first value for the one or more parameters.

In some examples of the method, apparatuses, and non-transitory computer-readable medium described herein, receiving the request to update the one or more parameters may include operations, features, means, or instructions for receiving the request to update the first value of a periodicity parameter of the one or more periodicity parameters for the periodic CSI-RS configuration, where the control signaling indicates the second value for the periodicity parameter.

In some examples of the method, apparatuses, and non-transitory computer-readable medium described herein, receiving the request to update the one or more parameters may include operations, features, means, or instructions for receiving the request to update a first periodicity parameter of the one or more periodicity parameters for the periodic CSI-RS configuration and the first value of a second periodicity parameter for the periodic CSI-RS configuration, where the control signaling indicates the second value for the first periodicity parameter and the second value for the second periodicity parameter.

In some examples of the method, apparatuses, and non-transitory computer-readable medium described herein, the first periodicity parameter may be associated with CSI-RSs used for channel tracking, and the second periodicity parameter may be associated with CSI-RSs used for interference tracking.

In some examples of the method, apparatuses, and non-transitory computer-readable medium described herein, receiving the request to update the one or more parameters may include operations, features, means, or instructions for receiving the request indicating an average periodicity for the periodic CSI-RS configuration and a variance for the average periodicity.

Some examples of the method, apparatuses, and non-transitory computer-readable medium described herein may further include operations, features, means, or instructions for receiving the request indicating a first average periodicity associated with CSI-RSs used for channel tracking and a second average periodicity associated with CSI-RSs used for interference tracking.

In some examples of the method, apparatuses, and non-transitory computer-readable medium described herein, receiving the request to update the one or more parameters may include operations, features, means, or instructions for receiving the request to update a reference signal density parameter of the one or more periodicity parameters for the periodic CSI-RS configuration, where the control signaling indicates the second value for the reference signal density parameter.

Some examples of the method, apparatuses, and non-transitory computer-readable medium described herein may further include operations, features, means, or instructions for receiving, from the UE, an indication of a latest slot associated with observed interference on a wireless channel between the UE and the base station.

Some examples of the method, apparatuses, and non-transitory computer-readable medium described herein may further include operations, features, means, or instructions for transmitting, to the UE, an indication of a set of multiple slots associated with observed interference on the wireless channel.

Some examples of the method, apparatuses, and non-transitory computer-readable medium described herein may further include operations, features, means, or instructions for transmitting, to the UE, an indication of a quantity of slots for observed interference reporting, where the set of multiple slots corresponds to the quantity of slots.

In some examples of the method, apparatuses, and non-transitory computer-readable medium described herein, transmitting the control signaling indicating the second value may include operations, features, means, or instructions for transmitting, in the control signaling, an indication of the second value for a periodicity for the periodic CSI-RS configuration, or a reference signal density for the periodic CSI-RS configuration, or any combination thereof.

DETAILED DESCRIPTION

Figure 1:
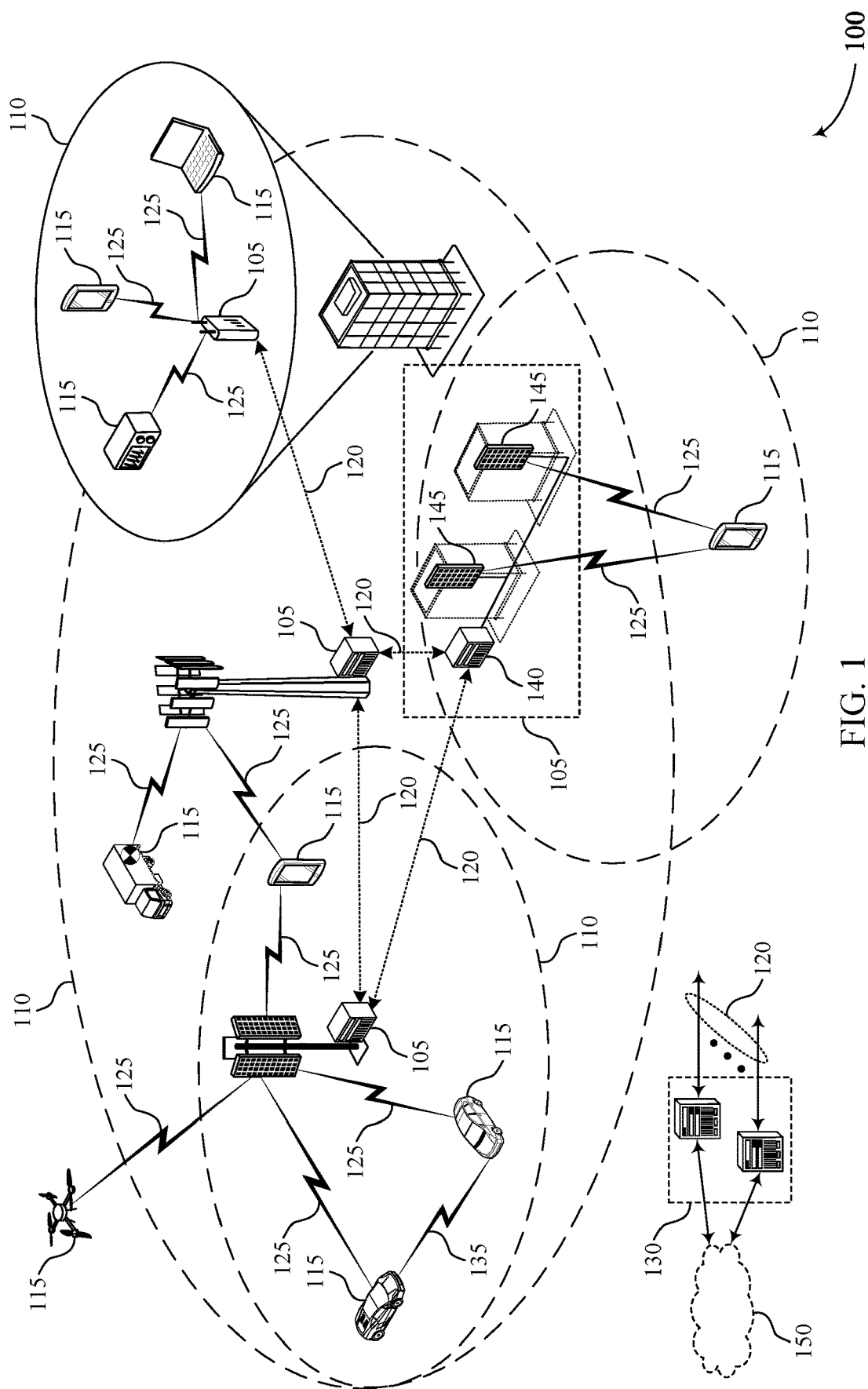
FIG. 1 illustrates an example of a wireless communications system that supports techniques for reporting channel state information (CSI) periodicity in accordance with aspects of the present disclosure.

In some wireless communication systems, a user equipment (UE) may measure channel state information (CSI) reference signals (CSI-RS) to determine and report characteristics of a downlink wireless channel to a base station. The UE may be configured to periodically, semi-persistently, or aperiodically generate and transmit a CSI report to the base station including CSI feedback. The base station may determine or adjust parameters for subsequent downlink signaling on the wireless channel based on the CSI feedback. In some cases, such as in a system supporting ultra-reliable low latency communications (URLLC), interference bursts from neighboring traffic may result in changes to channel conditions and interference levels. For example, if interference occurs when a UE generates and transmits a CSI report to a base station, but the interference has stopped by the time the base station transmits downlink signaling based on the reported CSI, the CSI report may no longer be valid or may include out-of-date information. For example, the channel conditions or interference levels may have changed such that the base station transmits using radio channel characteristics based on outdated or aged CSI, or the radio channel characteristics are no longer applicable to the current conditions. Using outdated CSI may result in failed transmission of downlink messages from the base station, transmission delivery delays, or unnecessary resource consumption.

Techniques described herein provide techniques for more current CSI reporting. For example, a UE may report, or request, a CSI periodicity based on channel characteristics, doppler and delay information, detected interference levels, interference patterns, and similar information. For example, if the UE detects frequent changes to channel conditions, the UE may request a shorter periodicity to increase the rate of CSI reporting, providing more up-to-date channel characteristics despite the presence of interference. In cases of less frequent changes to channel conditions, the UE may request a longer periodicity to minimize unnecessary resource consumption while still reporting up-to-date CSI feedback.

In some examples, the UE may report a first periodicity for CSI reports which are used for channel tracking (e.g., when interference is not observed), and the UE may report a second periodicity for CSI reports used for interference tracking (e.g., when interference is observed). In some cases, the UE may measure statistics of desired CSI periodicity and report a mean and variance of desired periodicity. In some examples, the UE may report a first desired periodicity for channel tracking and a second desired periodicity for interference tracking based on the mean and variance. In some cases, the UE may report a last or latest slot where interference was observed. The base station may adjust interference measurement resources and CSI-RS resource timing based on the reported slot or interference pattern. Adjusting CSI periodicity to the requested values may improve channel conditions or reduce unnecessary resource consumption, as the base station may transmit to the UE based on up-to-date channel characteristics.

Aspects of the disclosure are initially described in the context of wireless communications systems. Aspects of the disclosure are further illustrated by and described with reference to apparatus diagrams, system diagrams, and flowcharts that relate to techniques for reporting CSI periodicity.

FIG. 1 illustrates an example of a wireless communications system 100 that supports techniques for reporting CSI periodicity in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured to report CSI to a base station 105. For example, the UE 115 may be configured for a periodic CSI-RS configuration, or the UE 115 may be configured to be triggered for aperiodic or semi-persistent CSI reports. The UE 115 may transmit a request to a base station 105 to update one or more parameters for CSI reporting or the periodic CSI-RS configuration. For example, the UE 115 may transmit a request to the base station 105 to update a periodicity of the periodic CSI-RS configuration. In some cases, the UE 115 may detect a low Doppler scenario, or the UE 115 may detect little variance to channel conditions or interference levels, and the UE 115 may transmit the request indicating a longer periodicity for the periodic CSI-RS configuration. In some cases, the UE 115 may detect a higher Doppler scenario or high variance to the channel characteristics of the wireless channel, and the UE 115 may request a shorter periodicity. The base station 105 may update a configuration for CSI or for CSI-RS based on the request. For example, the base station 105 may update a periodicity for the periodic CSI-RS configuration based on the requested periodicity. Additionally, or alternatively, the base station 105 may trigger more or fewer aperiodic CSI reports for the UE 115 based on the request.

Figure 2:
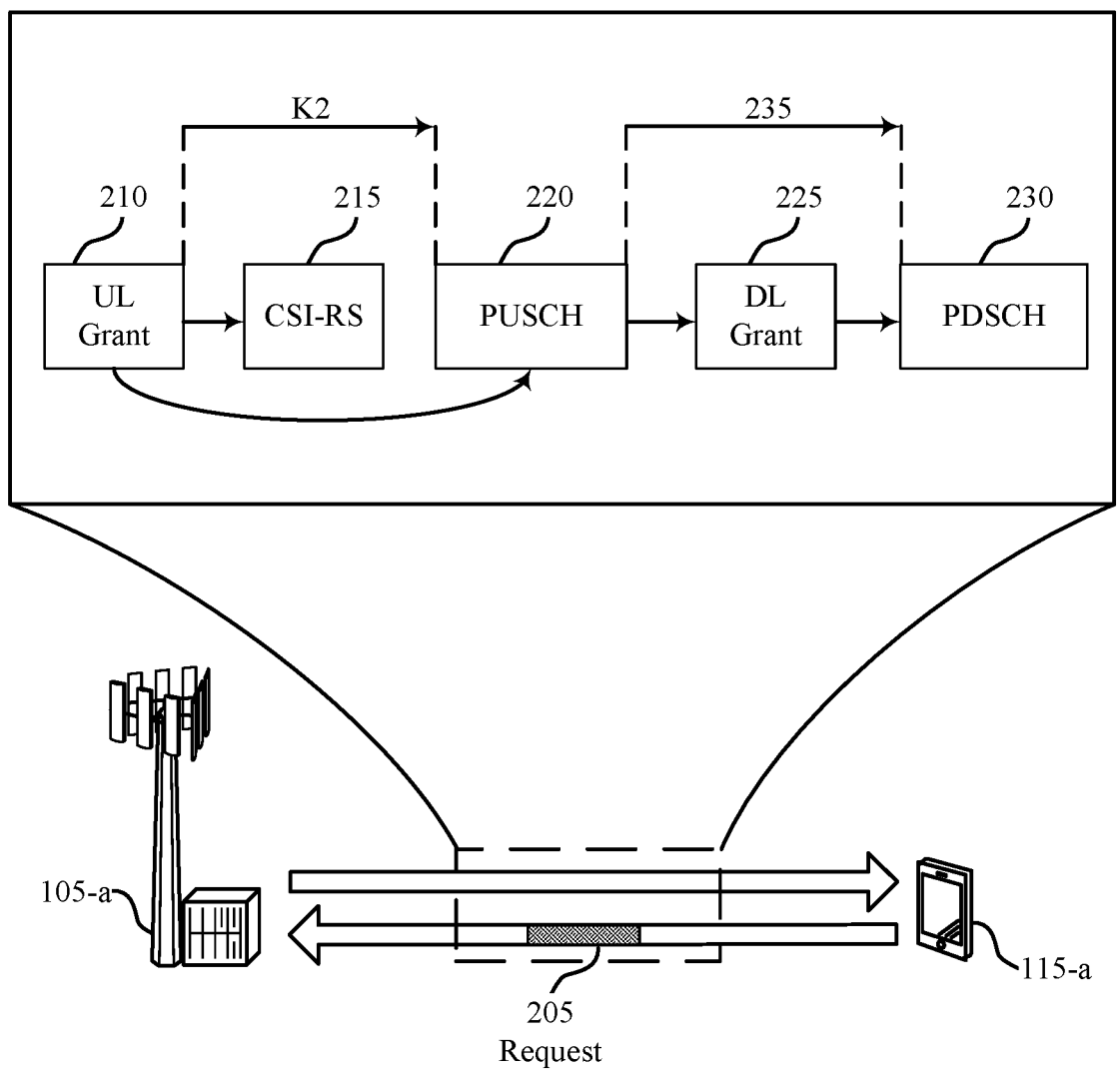
FIG. 2 illustrates an example of a wireless communications system that supports techniques for reporting CSI periodicity in accordance with aspects of the present disclosure.

FIG. 2 illustrates an example of a wireless communications system 200 that supports techniques for reporting CSI periodicity in accordance with aspects of the present disclosure. The wireless communications system 200 may implement aspects of wireless communications system 100 and may include UE 115-a and base station 105-a, which may be examples of a UE 115 and a base station 105 as described with reference to FIG. 1. In some examples, base station 105-a and one or more UEs 115, such as UE 115-a, may communicate control information, data, or both using a downlink communication link and an uplink communication link.

In some cases, UE 115-a may be configured to measure a CSI-RS 215 to determine characteristics of a radio channel, such as CSI or channel state feedback (CSF). For example, base station 105-a may transmit a CSI-RS 215 to UE 115-a, and UE 115-*a* may determine CSI based on the CSI-RS 215. Resources for the CSI-RS 215 may be periodically, semi-persistently, or aperiodically configured. For example, aperiodic CSI-RS resources may be triggered by downlink control information or a MAC CE for aperiodic CSI-RS reporting. Periodic CSI-RS resources may be configured for one or more UEs 115, such as via RRC signaling, and may be used for periodic CSI reporting, aperiodic CSI reporting, or semi-persistent CSI reporting.

UE 115-*a* may be configured to periodically, semi-persistently, or aperiodically report CSI. In some cases, UE 115-*a* may periodically transmit CSI reports on physical uplink control channel (PUCCH) resources. For example, UE 115-*a* may receive the CSI-RS 215 from base station 105-*a* and transmit a CSI report to base station 105-*a* on PUCCH resources according to a defined interval.

In some cases, UE 115-*a* may be configured to aperiodically transmit a CSI report on physical uplink shared channel (PUSCH) resources. For example, base station 105-*a* may transmit an uplink grant 210 to UE 115-*a*, triggering the aperiodic CSI reporting. Base station 105-*a* transmit the CSI-RS 215 to UE 115-*a*, and UE 115-*a* may measure the CSI-RS 215 to generate a CSI report. After an offset of a number of symbols or slots (e.g., K2 symbols or slots) between the uplink grant 210 and a scheduled PUSCH resource, UE 115-*a* may transmit a CSI report to base station 105-*a* (e.g., on a PUSCH resource 220). In some cases, aperiodic CSI feedback may be triggered by a downlink grant 225 and included in a PUCCH message. In some cases, UE 115-*a* may semi-persistently transmit CSI reports on PUCCH resources or PUSCH resources.

Base station 105-*a* may receive the CSI report and determine or adjust parameters or configurations for a wireless channel between UE 115-*a* and base station 105-*a* based on the CSI feedback. Base station 105-*a* may determine a modulation and coding scheme (MCS) rank, resource block allocation, precoding information, transmit power for subsequent physical downlink shared channel (PDSCH) transmission, or any combination thereof, among similar parameters. For example, base station 105-*a* may receive a CSI report on the PUSCH resources 220 and determine a set of parameters based on the CSI feedback. Base station 105-*a* may transmit a downlink grant 225 scheduling a subsequent transmission and transmit downlink signaling on a PDSCH resource 230 according to the parameters determined from the CSI report.

Some CSI reporting techniques may assume that channel characteristics and interference levels do not significantly change between a UE 115 transmitting a CSI report and a base station 105 transmitting downlink signaling. For example, base station 105-*a* may select parameters for the downlink transmission on the PDSCH resources 230 based on the earlier-received CSI received on the PUSCH resources 220. However, some systems may implement types of signaling with bursty or inconsistent traffic patterns. For example, in a system supporting ultra-reliable low latency communications (URLLC), interference bursts from neighboring traffic may result in large changes to channel conditions and interference levels. For example, interference may occur when UE 115-*a* transmits the CSI report on the PUSCH resource 220, but the interference may stop by the time base station 105-*a* transmits downlink signaling on the PDSCH resource 230. Therefore, the information of the CSI report may be outdated or no longer be valid, and base station 105-*a* may transmit downlink signaling on the PDSCH resource 230 using radio channel characteristics of the outdated or aged CSI. For example, base station 105-*a* may have increased a transmit power to overcome the interference detected by UE 115-*a*, but this increased transmit power may be too high for a wireless channel without interference. Using outdated CSI may result in communications failure, transmission delivery delays, or unnecessary resource or power consumption.

The wireless communications system 200 may implement techniques to provide more up-to-date or more reliable CSI. For example, UE 115-*a* may report, or request, a CSI periodicity for a CSI-RS configuration to base station 105-*a*. In some cases, UE 115-*a* may characteristics such as doppler, delay spread, channel characteristics, among others, and determine a CSI periodicity such that the reported CSI reflects the actual channel characteristics when base station 105-*a* transmits downlink signaling. For example, UE 115-*a* may determine a desired periodicity and transmit a request 205 for the desired periodicity to base station 105-*a*. The desired CSI periodicity may be determined such that the frequency at which UE 115-*a* reports CSI is frequent enough to avoid changes to interference levels or changes to channel characteristics without wasting unnecessary resources.

In some cases, base station 105-*a* may receive the request 205 and update a configuration for the CSI-RS or CSI reporting accordingly. For example, base station 105-*a* may update a periodicity for CSI-RS resources based on the requested periodicity. Additionally, or alternatively, base station 105-*a* may schedule UE 115-*a* for aperiodic CSI base on the indicated periodicity. For example, if UE 115-*a* requests a shorter periodicity, base station 105-*a* may trigger more frequency aperiodic CSI at UE 115-*a* or use a shorter CSF periodicity. If UE 115-*a* requests a longer periodicity, base station 105-*a* may trigger fewer aperiodic CSI at UE 115-*a* or use a longer CSF periodicity.

In some additional, or alternative, examples, UE 115-*a* may report or request other parameters, such as different resource allocations or resource patterns, among others. UE 115-*a* may transmit the request 205 in an uplink shared channel message, an uplink control channel message, an RRC message, a MAC CE, or any combination thereof. In some cases, the request 205 may be included with a CSI report.

The CSI-RS periodicity may be set to determine exact sampling of the channel an interference. For example, if UE 115-*a* detects frequent changes to channel conditions, UE 115-*a* may request to transmit CSI reports at a higher periodicity to provide more frequent and more up-to-date channel characteristics to base station 105-*a*, despite the presence of interference. For example, UE 115-*a* may detect high doppler (e.g., moving at a high speed) and send a request to base station 105-*a* for a shorter CSI-RS periodicity. Using a shorter periodicity may enable base station 105-*a* to quickly acquire the channel quality index, rank, precoder, or the like at high doppler (e.g., high speed scenarios). Increasing CSI periodicity at high doppler may reduce a number of retransmissions and reduce delivery delays. In some cases, the resources freed up by fewer retransmissions may then be used for a new transmission or for other UEs 115.

In another example, the channel may be static or slowly varying. For example, UE 115-*a* may detect a low doppler (e.g., low speed) situation, and UE 115-*a* may request a larger periodicity for the periodic CSI-RS. In cases of less frequent changes to channel conditions, UE 115-*a* may transmit CSI reports less frequently (e.g., larger periodicity) to minimize unnecessary resource consumption while still providing up-to-date channel characteristics to base station 105-*a*. For example, UE 115-*a* may experience low doppler (e.g., moving at a slow speed or stationary) and report, or request, for base station 105-a to longer desired periodicity. By increasing the length of the periodicity, UE 115-a may monitor and measure CSI-RS resources and operate its channel state feedback functionality at a lower rate, thus conserving UE 115-a hardware cycles and computational power.

In some cases, UE 115-a may report, or request, different CSI-RS periodicities for different uses. For example, UE 115-a may report a first periodicity for channel tracking (e.g., when interference is not observed) and a second periodicity for interference tracking (e.g., when interference is observed). In some cases, the first periodicity may be referred to as $L_c$, corresponding to a periodicity for channel tracking, and the second periodicity may be referred to as $L_i$, corresponding to a periodicity for interference tracking. In some cases, UE 115-a may request different periodicities for different types of CSI-RS, different types of CSI reports, or different types of measurements on CSI-RS. In some examples, both periodicities may be configured (e.g., radio resource controlled/MAC control element configured).

For example, UE 115-a may request the first periodicity for channel tracking and the second periodicity for interference tracking. Base station 105-a may then configure the first periodicity and the second periodicity at UE 115-a (e.g., via RRC signaling or a MAC CE). UE 115-a may report CSI according to the first periodicity when interference is not detected, and UE 115-a may report CSI according to the second periodicity when interference is detected.

In some cases, UE 115-a may measure statistics of desired CSI periodicity and report a mean and variance of the desired periodicity. For example, UE 115-a may measure the statistics of best CSI periodicity and report the mean and variance of the desired periodicities. For example, UE 115-a may determine multiple desired periodicities over time, average the desired periodicities, and report the average desired periodicities. UE 115-a may similarly report, or request, an average desired periodicities and corresponding variances for channel tracking scenarios and interference tracking scenarios.

In some cases, UE 115-a may report a last or latest slot where interference was observed to base station 105-a. Base station 105-a may adjust interference measurement resources and CSI-RS resource timing based on the reported slot or interference pattern. In some cases, base station 105-a may configure UE 115-a to report a given number of last instants, slots, or subslots where interference was observed. For example, base station 105-a may configure UE 115-a to report the last K instants, slots, or subslots where UE 115-a detected interference, where K may be configurable via RRC signaling, downlink control information, or a MAC CE. Base station 105-a may then transmit control signaling to reconfigure interference measurement resources at UE 115-a based on the reported detected interference. In some cases, UE 115-a may include the indication of the latest one or more slots where interference was observed with, or as part of, the request 205. Additionally, or alternatively, UE 115-a may transmit separate signaling to indicate the latest one or more slots or TTIs with detected interference.

Implementing these techniques to adjust CSI periodicity to the requested values may improve channel conditions or reduce unnecessary resource consumption, as the base station may transmit to the UE based on up-to-date channel characteristics. Base station 105-a may receive the request 205 and configure, reconfigure, or adjust parameters for the periodic CSI-RS configuration at UE 115-a accordingly. For example, base station 105-a may reconfigure a periodicity for the periodic CSI-RS configuration, or base station 105-a may assign different interference measurement resources to UE 115-a based on the request 205.

As an example, UE 115-a may be in a mobility scenario where the speed of UE 115-a changes. The wireless communications system 200 may support techniques to change CSI periodicity based on factors such as doppler and speed. For example, UE 115-a may change from travelling at a low speed to traveling at a high speed, such as if a user carrying UE 115-a boards a bus or train. UE 115-a may detect the high doppler, high speed, etc. and indicate, or request, a shorter CSI periodicity via the request 205. Base station 105-a may, in response, either trigger more frequent aperiodic CSI reports at UE 115-a or adjust (e.g., shorten) a CSF periodicity for a periodic CSI configuration or periodic CSI-RS configuration at UE 115-a. Similarly, if UE 115-a leaves the train or bus, UE 115-a may indicate, or request, a longer CSI periodicity via another request. Base station 105-a may then trigger fewer aperiodic CSI reports at UE 115-a in response to the second request or increase a CSF periodicity at UE 115-a.

Figure 3:
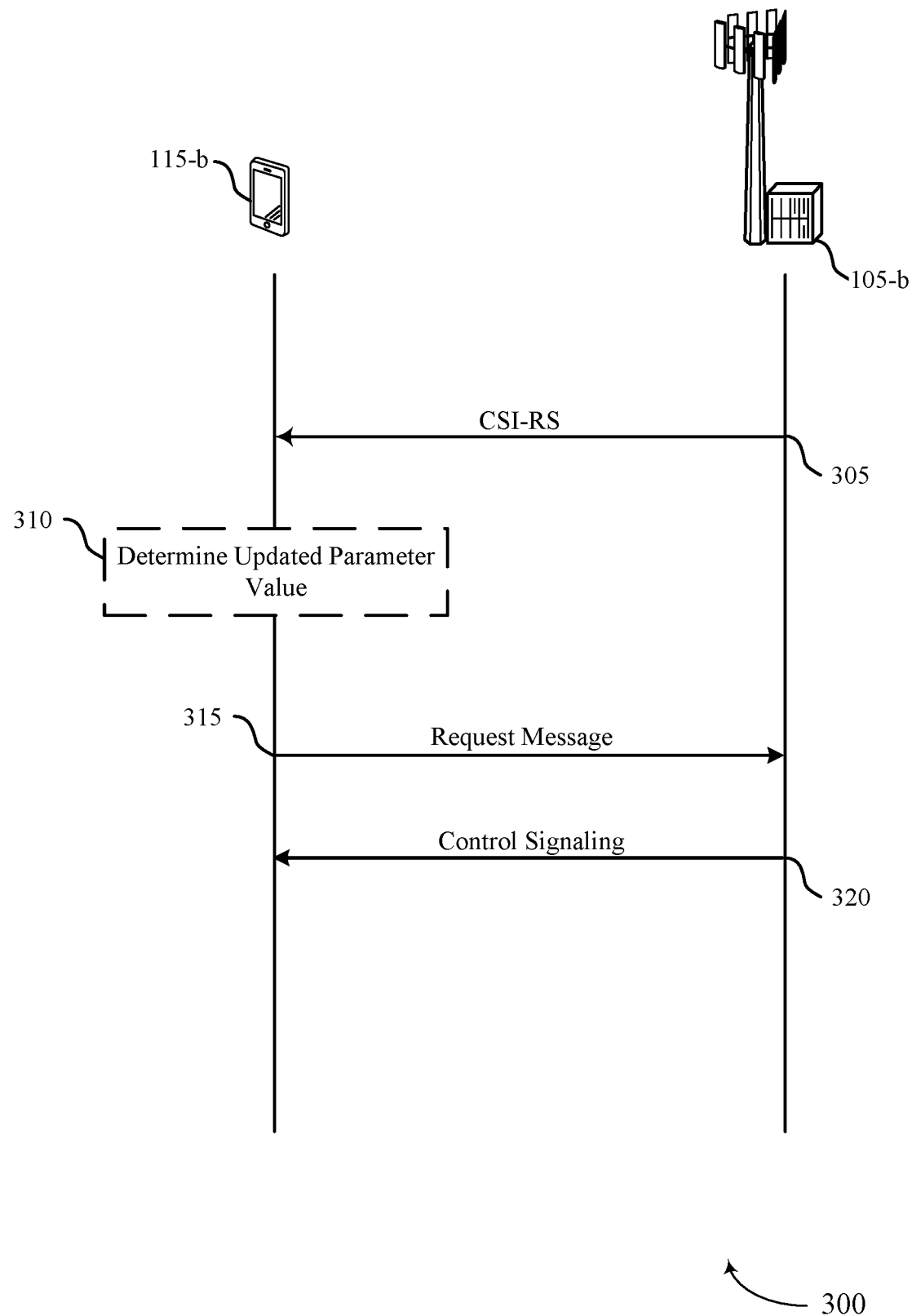
FIG. 3 illustrates an example of a process flow that supports techniques for reporting CSI periodicity in accordance with aspects of the present disclosure.

FIG. 3 illustrates an example of a process flow 300 that supports techniques for reporting CSI periodicity in accordance with aspects of the present disclosure. The process flow 300 may be implemented by UE 115-b or base station 105-b, or both, which may be respective examples of a UE 115 and a base station 105 as described with reference to FIG. 1. In some cases, some operations of the process flow 300 may be performed in different orders than what is shown. Additionally, or alternatively, some additional procedures or signaling may be performed, or some procedures or signaling may not be performed, or both.

UE 115-b may be configured to generate and report CSI-RS measurements. For example, at 305, UE 115-b may receive, from base station 105-b, one or more CSI-RS according to a periodic CSI-RS configuration identifying a first value for one or more parameters.

In some cases, UE 115-a may determine an updated value for the one or more parameters of the periodic CSI-RS configuration. For example, at 310, UE 115-a may determine an updated value for one or more of a reference signal density parameter or a desired CSI periodicity, among other parameters. The updated one or more values may be based on, for example, a Doppler spread of UE 115-b, a delay spread of UE 115-b, a Doppler shift of UE 115-b, channel characteristics of a wireless channel between UE 115-b and base station 105-b, an interference time and frequency pattern on the wireless channel, and time and frequency coherency of the wireless channel, or any combination thereof.

At 315, UE 115-b may transmit, to base station 105-b, a request to update the one or more parameters of the periodic CSI-RS configuration based on the received one or more periodic CSI-RS. For example, UE 115-b may transmit the request to update the first value of a periodicity parameter of the one or more periodicity parameters for the periodic CSI-RS configuration.

In some cases, UE 115-b may transmit the request to update a first periodicity parameter of the one or more periodicity parameters for the periodic CSI-RS configuration and the first value of a second periodicity parameter for the periodic CSI-RS configuration. For example, UE 115-b may request to update a periodicity of CSI-RS used for channel tracking or a periodicity of CSI-RS used for interference tracking, or both.

Additionally, or alternatively, UE 115-b may transmit the request indicating a determined average periodicity and variance for the average periodicity. For example, UE 115-*b* may determine the average periodicity for the periodic CSI-RS configuration and a variance for the average periodicity based on a set of multiple estimated periodicities for the periodic CSI-RS configuration. In some cases, UE 115-*b* may determine a first average periodicity for CSI associated with channel tracking and a second average periodicity for CSI associated with interference tracking.

In some examples, UE 115-*b* may transmit an indication of a latest slot associated with observed interference on a wireless channel between UE 115-*b* and base station 105-*b*. For example, UE 115-*b* may indicate the latest K slots where UE 115-*b* detected interference on the wireless channel. In some cases, the value of K may be configured by base station 105-*b*. In some cases, UE 115-*b* may indicate the latest slot, latest symbol, latest subslot, etc. where interference was detected. The indication may be an explicit indication or an implicit indication. In some cases, the indication of the latest slot with observed interference may be included with the request for the updated value for the one or more parameters, or the indication may be transmitted separately.

Base station 105-*b* may receive the request message and may update one or more configurations or parameters in response. For example, at 320, UE 115-*b* may receive, from base station 105-*b* in response to the request, control signaling indicating a second value for the one or more parameters of the periodic CSI-RS configuration. The second value may be different from the first value for the one or more parameters. For example, base station 105-*b* may update a periodicity for the periodic CSI-RS configuration. In some cases, base station 105-*b* may update the periodicity to the requested periodicity. Additionally, or alternatively, base station 105-*b* may update a reference signal resource density or an interference measurement resource assignment for UE 115-*b*. In some cases, in response to receiving the request message, base station 105-*b* may trigger fewer aperiodic CSI-RS at UE 115-*b*.

Figure 4:
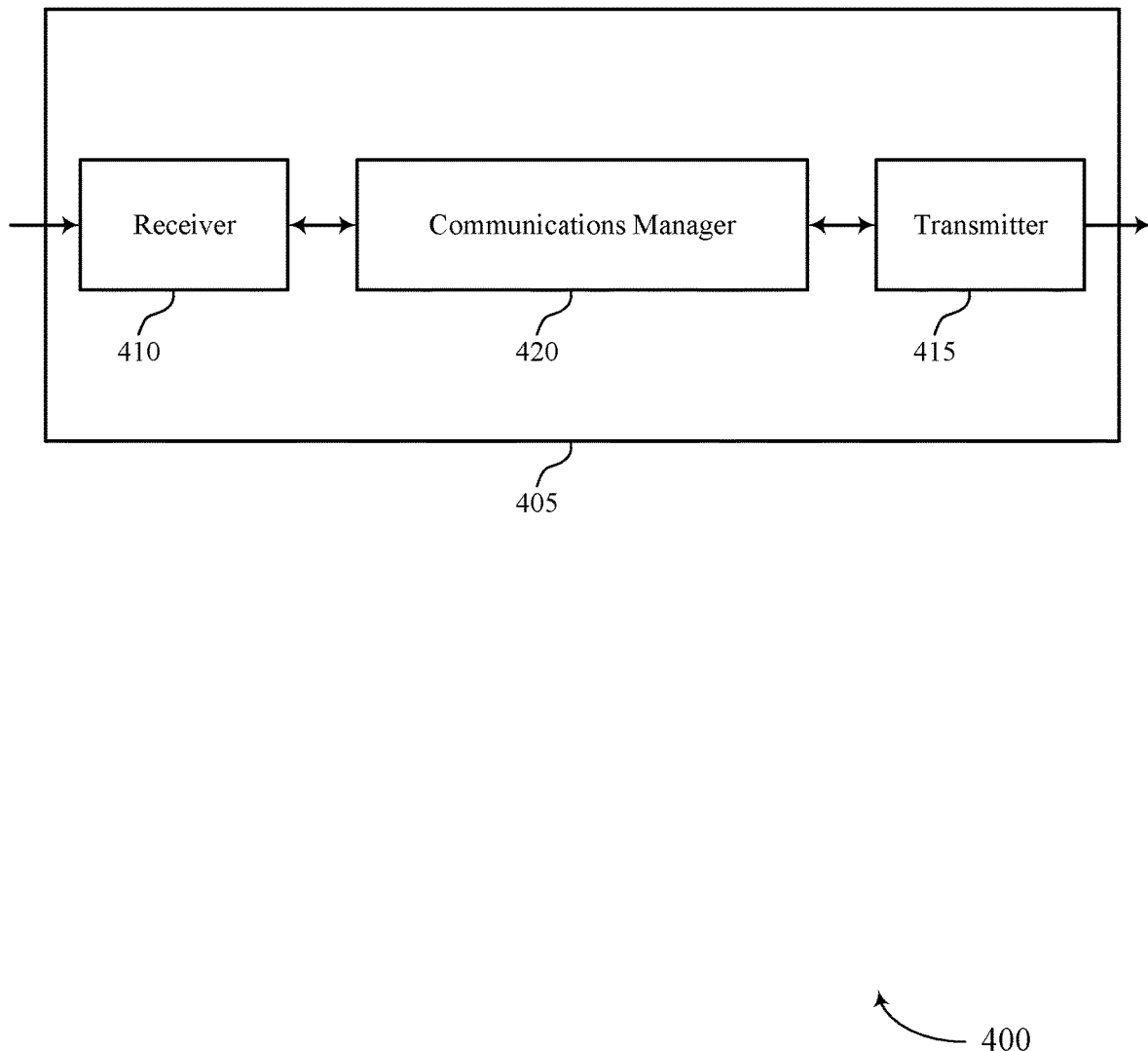
FIGS. 4 and 5 show block diagrams of devices that support techniques for reporting CSI periodicity in accordance with aspects of the present disclosure.

FIG. 4 shows a block diagram 400 of a device 405 that supports techniques for reporting CSI periodicity in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for reporting CSI periodicity). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for reporting CSI periodicity). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for reporting CSI periodicity as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, one or more CSI-RSs according to a periodic CSI-RS configuration identifying a first value for one or more parameters. The communications manager 420 may be configured as or otherwise support a means for transmitting, to the base station, a request to update the one or more parameters of the periodic CSI-RS configuration based on the received one or more periodic CSI-RSs. The communications manager 420 may be configured as or otherwise support a means for receiving, from the base station at least in part in response to the request, control signaling indicating a second value for the one or more parameters of the periodic CSI-RS configuration, the second value different from the first value for the one or more parameters.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources. For example, the device 405 may request a periodicity for a periodic CSI-RS configuration which either more efficiently utilizes resources or provides more accurate CSI information, which may reduce a number of retransmissions to the device 405.

Figure 5:
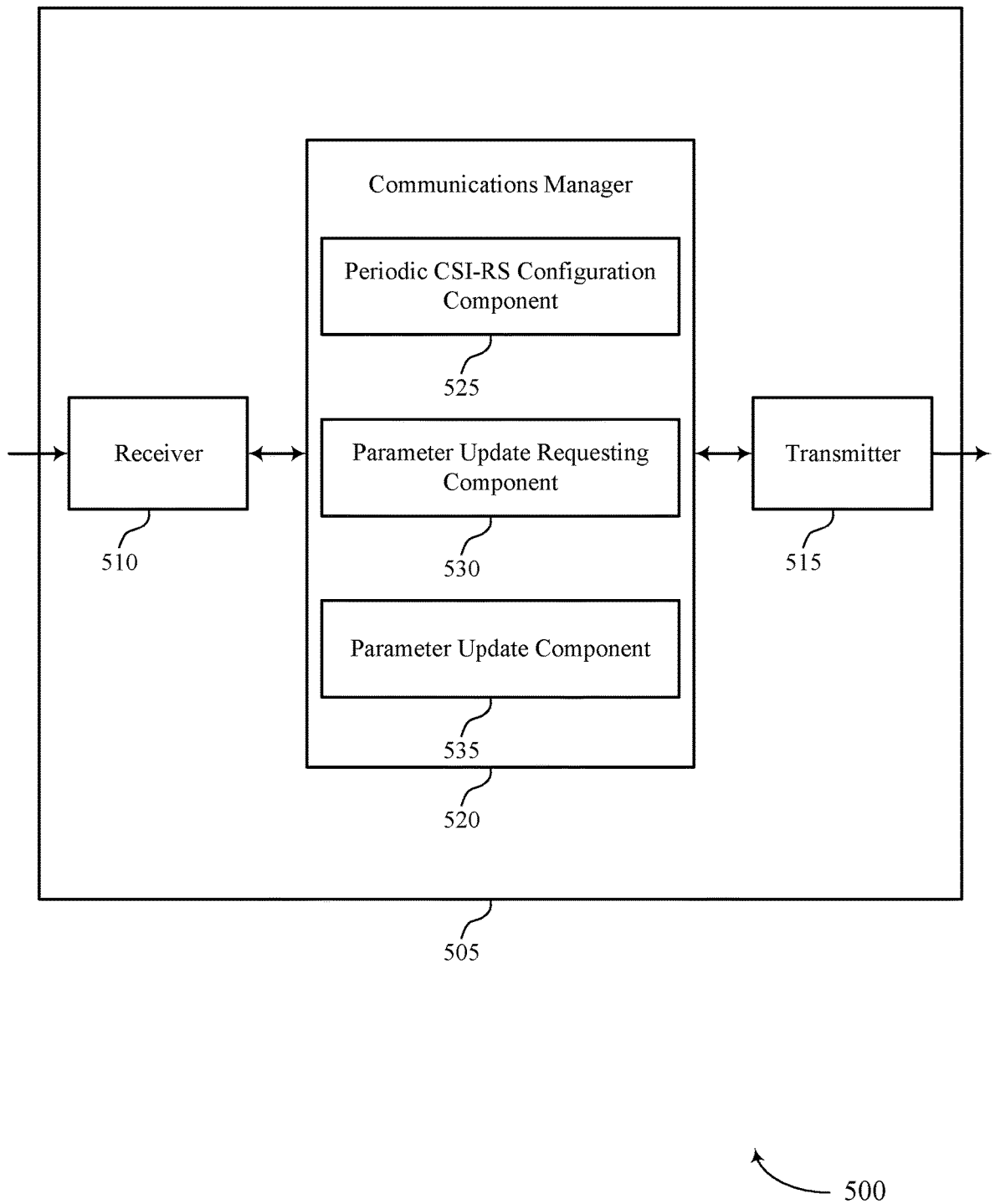

FIG. 5 shows a block diagram 500 of a device 505 that supports techniques for reporting CSI periodicity in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for reporting CSI periodicity). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for reporting CSI periodicity). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for reporting CSI periodicity as described herein. For example, the communications manager 520 may include a periodic CSI-RS configuration component 525, a parameter update requesting component 530, a parameter update component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The periodic CSI-RS configuration component 525 may be configured as or otherwise support a means for receiving, from a base station, one or more CSI-RSs according to a periodic CSI-RS configuration identifying a first value for one or more parameters. The parameter update requesting component 530 may be configured as or otherwise support a means for transmitting, to the base station, a request to update the one or more parameters of the periodic CSI-RS configuration based on the received one or more periodic CSI-RSs. The parameter update component 535 may be configured as or otherwise support a means for receiving, from the base station at least in part in response to the request, control signaling indicating a second value for the one or more parameters of the periodic CSI-RS configuration, the second value different from the first value for the one or more parameters.

Figure 6:
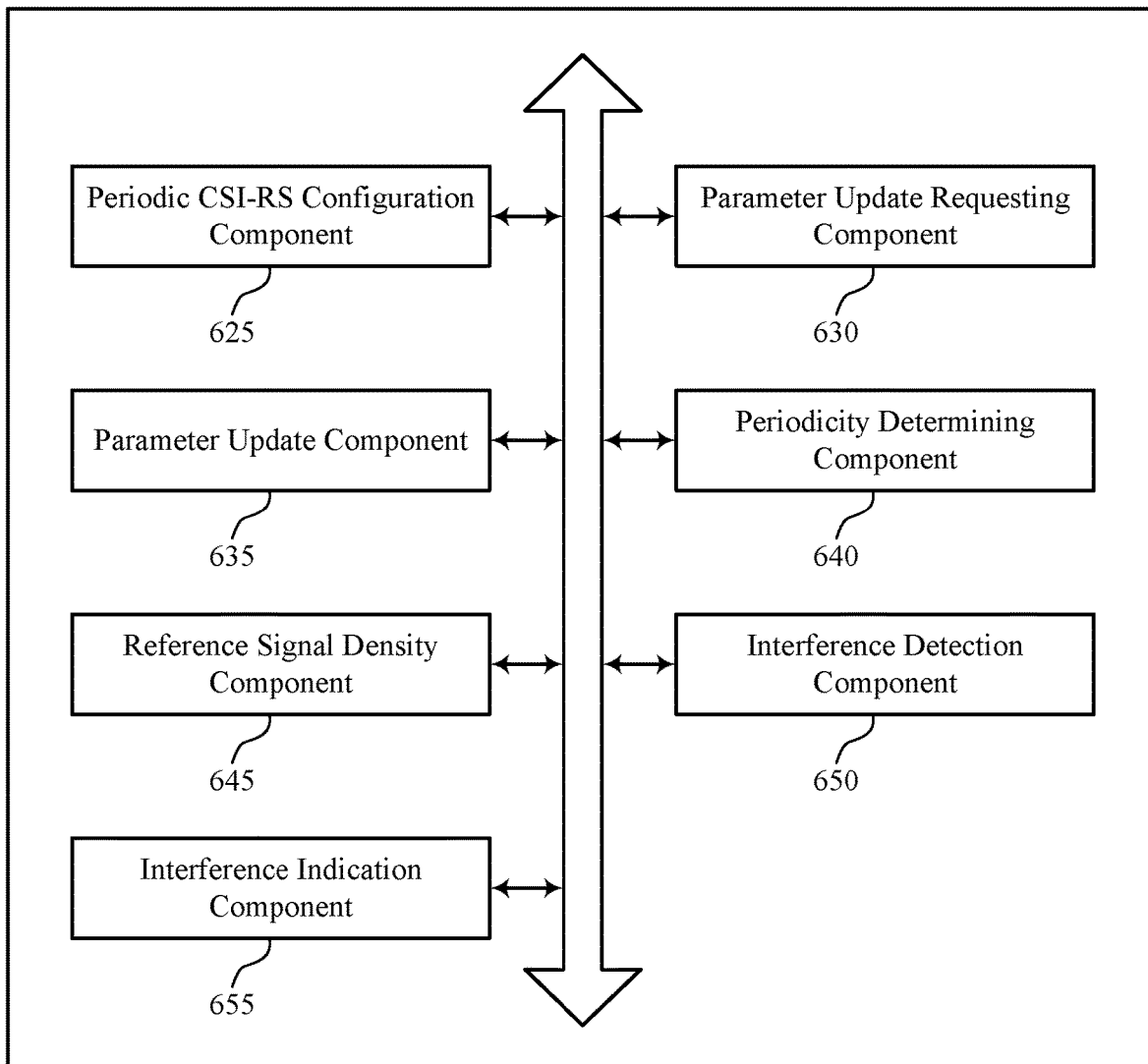
FIG. 6 shows a block diagram of a communications manager that supports techniques for reporting CSI periodicity in accordance with aspects of the present disclosure.

FIG. 6 shows a block diagram 600 of a communications manager 620 that supports techniques for reporting CSI periodicity in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for reporting CSI periodicity as described herein. For example, the communications manager 620 may include a periodic CSI-RS configuration component 625, a parameter update requesting component 630, a parameter update component 635, a periodicity determining component 640, a reference signal density component 645, an interference detection component 650, an interference indication component 655, or any combination thereof. Each of these components may communicate, directly or indirectly, with one another (e.g., via one or more buses).

The communications manager 620 may support wireless communication at a UE in accordance with examples as disclosed herein. The periodic CSI-RS configuration component 625 may be configured as or otherwise support a means for receiving, from a base station, one or more CSI-RSs according to a periodic CSI-RS configuration identifying a first value for one or more parameters. The parameter update requesting component 630 may be configured as or otherwise support a means for transmitting, to the base station, a request to update the one or more parameters of the periodic CSI-RS configuration based on the received one or more periodic CSI-RSs. The parameter update component 635 may be configured as or otherwise support a means for receiving, from the base station at least in part in response to the request, control signaling indicating a second value for the one or more parameters of the periodic CSI-RS configuration, the second value different from the first value for the one or more parameters.

In some examples, to support transmitting the request to update the one or more parameters, the parameter update requesting component 630 may be configured as or otherwise support a means for transmitting the request to update the first value of a periodicity parameter of the one or more periodicity parameters for the periodic CSI-RS configuration, where the control signaling indicates the second value for the periodicity parameter.

In some examples, the parameter update requesting component 630 may be configured as or otherwise support a means for determining the periodicity value based on a Doppler spread, a delay spread, a Doppler shift, channel characteristics of a wireless channel between the UE and the base station, an interference time and frequency pattern on the wireless channel, a time and frequency coherency of the wireless channel, or any combination thereof.

In some examples, to support transmitting the request to update the one or more parameters, the parameter update requesting component 630 may be configured as or otherwise support a means for transmitting the request to update a first periodicity parameter of the one or more periodicity parameters for the periodic CSI-RS configuration and the first value of a second periodicity parameter for the periodic CSI-RS configuration, where the control signaling indicates the second value for the first periodicity parameter and the second value for the second periodicity parameter.

In some examples, the first periodicity parameter is associated with CSI-RSs used for channel tracking, and the second periodicity parameter is associated with CSI-RSs used for interference tracking.

In some examples, to support transmitting the request to update the one or more parameters, the periodicity determining component 640 may be configured as or otherwise support a means for determining, by the UE, an average periodicity for the periodic CSI-RS configuration and a variance for the average periodicity based on a set of multiple estimated periodicities for the periodic CSI-RS configuration. In some examples, to support transmitting the request to update the one or more parameters, the periodicity determining component 640 may be configured as or otherwise support a means for transmitting the request indicating the determined average periodicity and the variance for the average periodicity.

In some examples, the periodicity determining component 640 may be configured as or otherwise support a means for determining a first average periodicity associated with CSI-RSs used for channel tracking and a second average periodicity associated with CSI-RSs used for interference tracking.

In some examples, to support transmitting the request to update the one or more parameters, the reference signal density component 645 may be configured as or otherwise support a means for transmitting the request to update a reference signal density parameter of the one or more periodicity parameters for the periodic CSI-RS configuration, where the control signaling indicates the second value for the reference signal density parameter.

In some examples, the reference signal density component 645 may be configured as or otherwise support a means for determining, by the UE, the reference signal density based on a Doppler spread, a delay spread, a Doppler shift, channel characteristics of a wireless channel between the UE and the base station, an interference time and frequency pattern on the wireless channel, a time and frequency coherency of the wireless channel, or any combination thereof.

In some examples, the interference detection component 650 may be configured as or otherwise support a means for transmitting, to the base station, an indication of a latest slot associated with observed interference on a wireless channel between the UE and the base station.

In some examples, the interference indication component 655 may be configured as or otherwise support a means for transmitting an indication of a set of multiple slots associated with observed interference on the wireless channel.

In some examples, the interference detection component 650 may be configured as or otherwise support a means for receiving, from the base station, an indication of a quantity of slots for observed interference reporting, where the set of multiple slots corresponds to the quantity of slots.

In some examples, to support receiving the control signaling indicating the second value, the parameter update component 635 may be configured as or otherwise support a means for receiving, in the control signaling, an indication of the second value for a periodicity for the periodic CSI-RS configuration, or a reference signal density for the periodic CSI-RS configuration, or any combination thereof.

Figure 7:
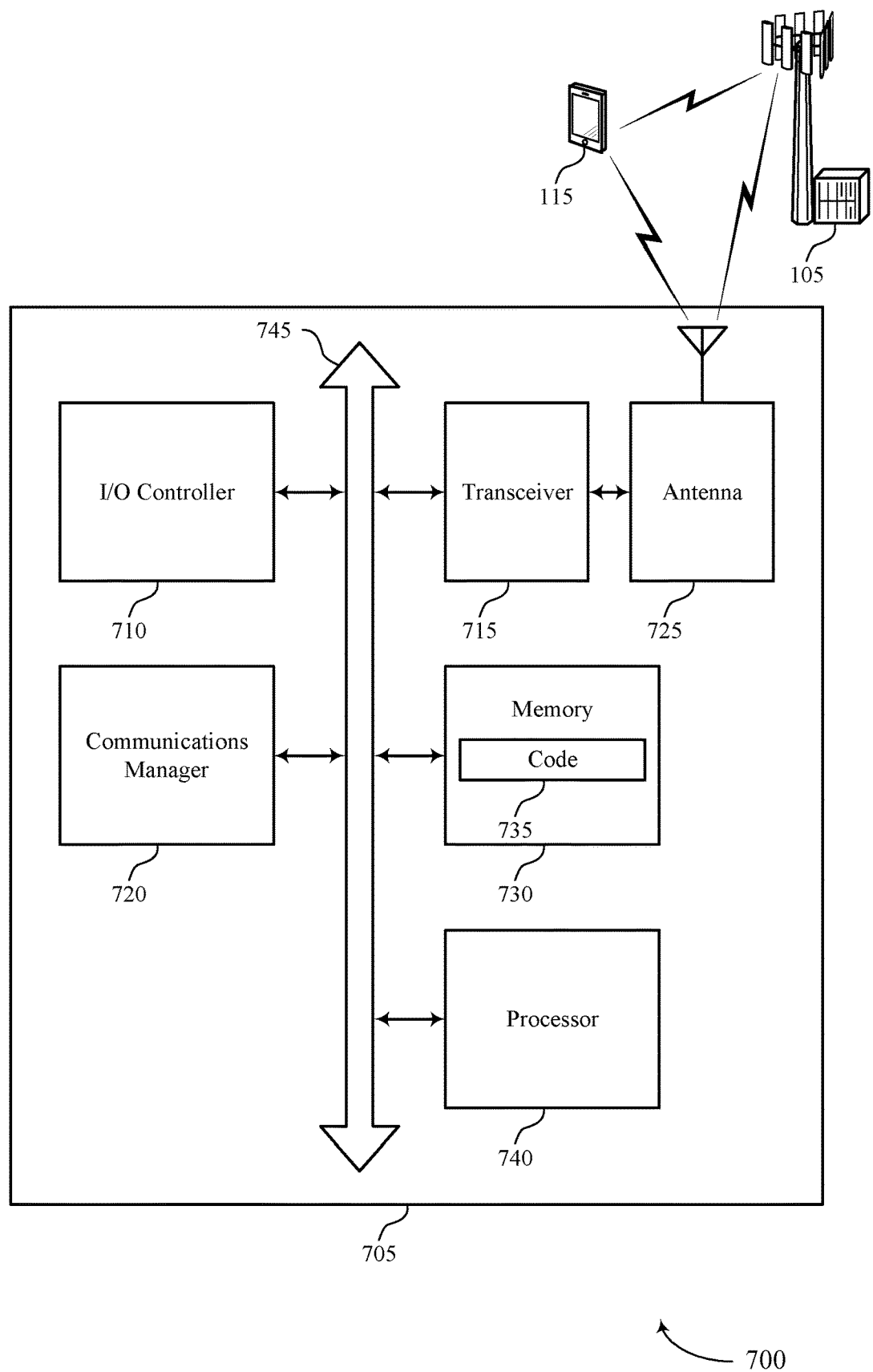
FIG. 7 shows a diagram of a system including a device that supports techniques for reporting CSI periodicity in accordance with aspects of the present disclosure.

FIG. 7 shows a diagram of a system 700 including a device 705 that supports techniques for reporting CSI periodicity in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for reporting CSI periodicity). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, one or more CSI-RSs according to a periodic CSI-RS configuration identifying a first value for one or more parameters. The communications manager 720 may be configured as or otherwise support a means for transmitting, to the base station, a request to update the one or more parameters of the periodic CSI-RS configuration based on the received one or more periodic CSI-RSs. The communications manager 720 may be configured as or otherwise support a means for receiving, from the base station at least in part in response to the request, control signaling indicating a second value for the one or more parameters of the periodic CSI-RS configuration, the second value different from the first value for the one or more parameters.

By including or configuring the communications manager 720 in accordance with examples as described herein, the device 705 may support techniques for improved communication reliability and more efficient utilization of communication resources, improved coordination between devices. For example, in some cases, the device 705 may request to reduce the length of a periodicity of a periodic CSI-RS configuration, which may provide more reliable CSI if the device 705 is in a high speed scenario or an environment with quickly varying channel conditions. In another example, the device 705 may request to increase the length of the periodicity of the CSI-RS configuration, which may reduce resource utilization while still providing highly accurate CSI information, such as if the device 705 is in a low doppler scenario or an environment with few wireless channel changes.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for reporting CSI periodicity as described herein, or the processor 740 and the memory 730 may be otherwise configured to perform or support such operations.

Figure 8:
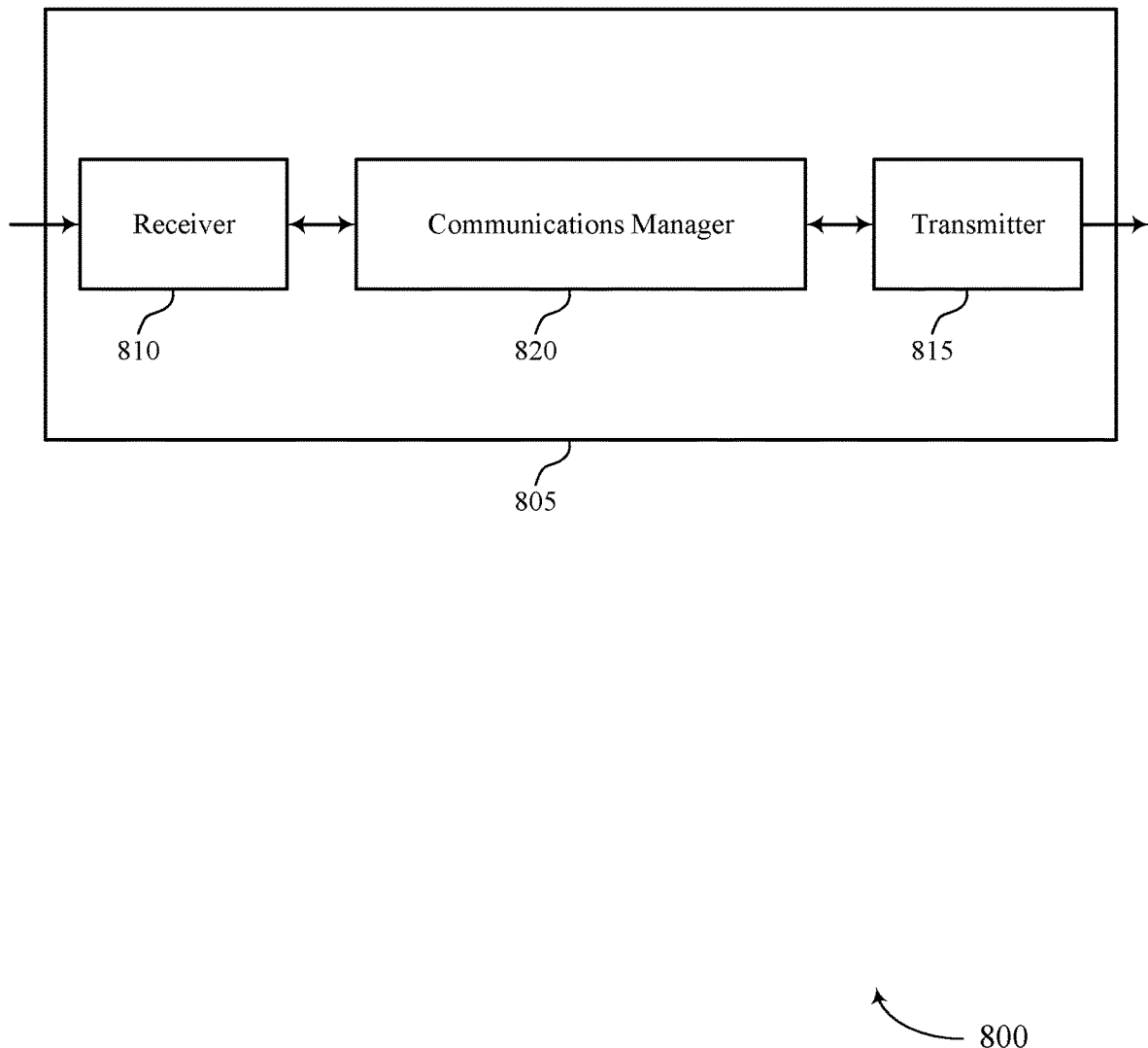
FIGS. 8 and 9 show block diagrams of devices that support techniques for reporting CSI periodicity in accordance with aspects of the present disclosure.

FIG. 8 shows a block diagram 800 of a device 805 that supports techniques for reporting CSI periodicity in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for reporting CSI periodicity). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for reporting CSI periodicity). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for reporting CSI periodicity as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, one or more CSI-RSs according to a periodic CSI-RS configuration identifying a first value for one or more parameters. The communications manager 820 may be configured as or otherwise support a means for receiving, from the UE, a request to update the one or more parameters of the periodic CSI-RS configuration based on the transmitted one or more periodic CSI-RSs. The communications manager 820 may be configured as or otherwise support a means for transmitting, to the UE based at least in part in response to the request, control signaling indicating a second value for the one or more parameters of the periodic CSI-RS configuration, the second value different from the first value for the one or more parameters.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources. For example, the device 805 may receive a request from a UE 115 to update a periodicity for a periodic CSI-RS configuration, and the device 805 may update the periodicity in response to the request. Updating the periodicity may either more efficiently utilizes resources or provides more accurate CSI information, which may reduce a number of retransmissions to the UE 115.

Figure 9:
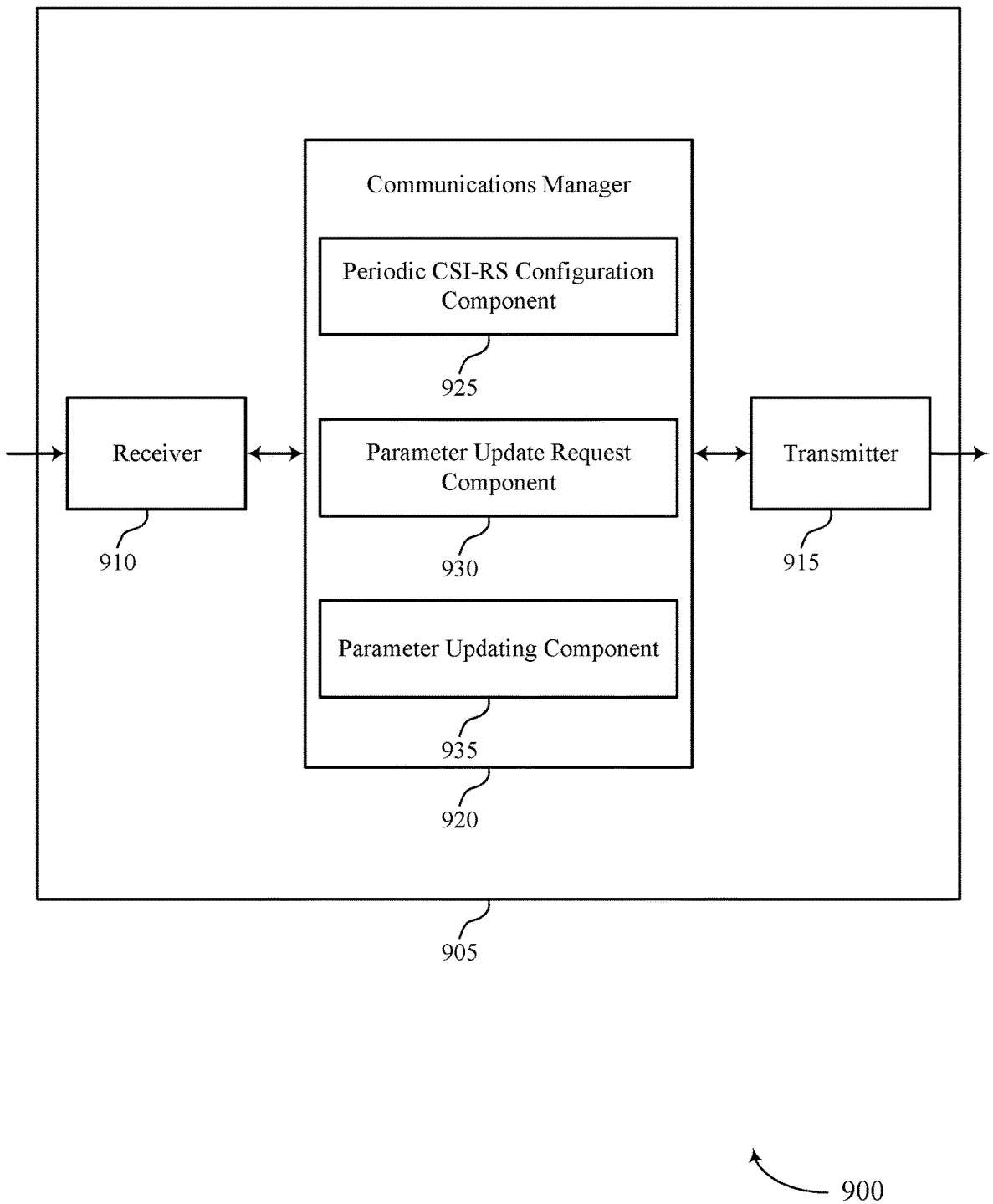

FIG. 9 shows a block diagram 900 of a device 905 that supports techniques for reporting CSI periodicity in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for reporting CSI periodicity). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for reporting CSI periodicity). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for reporting CSI periodicity as described herein. For example, the communications manager 920 may include a periodic CSI-RS configuration component 925, a parameter update request component 930, a parameter updating component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The periodic CSI-RS configuration component 925 may be configured as or otherwise support a means for transmitting, to a UE, one or more CSI-RSs according to a periodic CSI-RS configuration identifying a first value for one or more parameters. The parameter update request component 930 may be configured as or otherwise support a means for receiving, from the UE, a request to update the one or more parameters of the periodic CSI-RS configuration based on the transmitted one or more periodic CSI-RSs. The parameter updating component 935 may be configured as or otherwise support a means for transmitting, to the UE based at least in part in response to the request, control signaling indicating a second value for the one or more parameters of the periodic CSI-RS configuration, the second value different from the first value for the one or more parameters.

Figure 10:
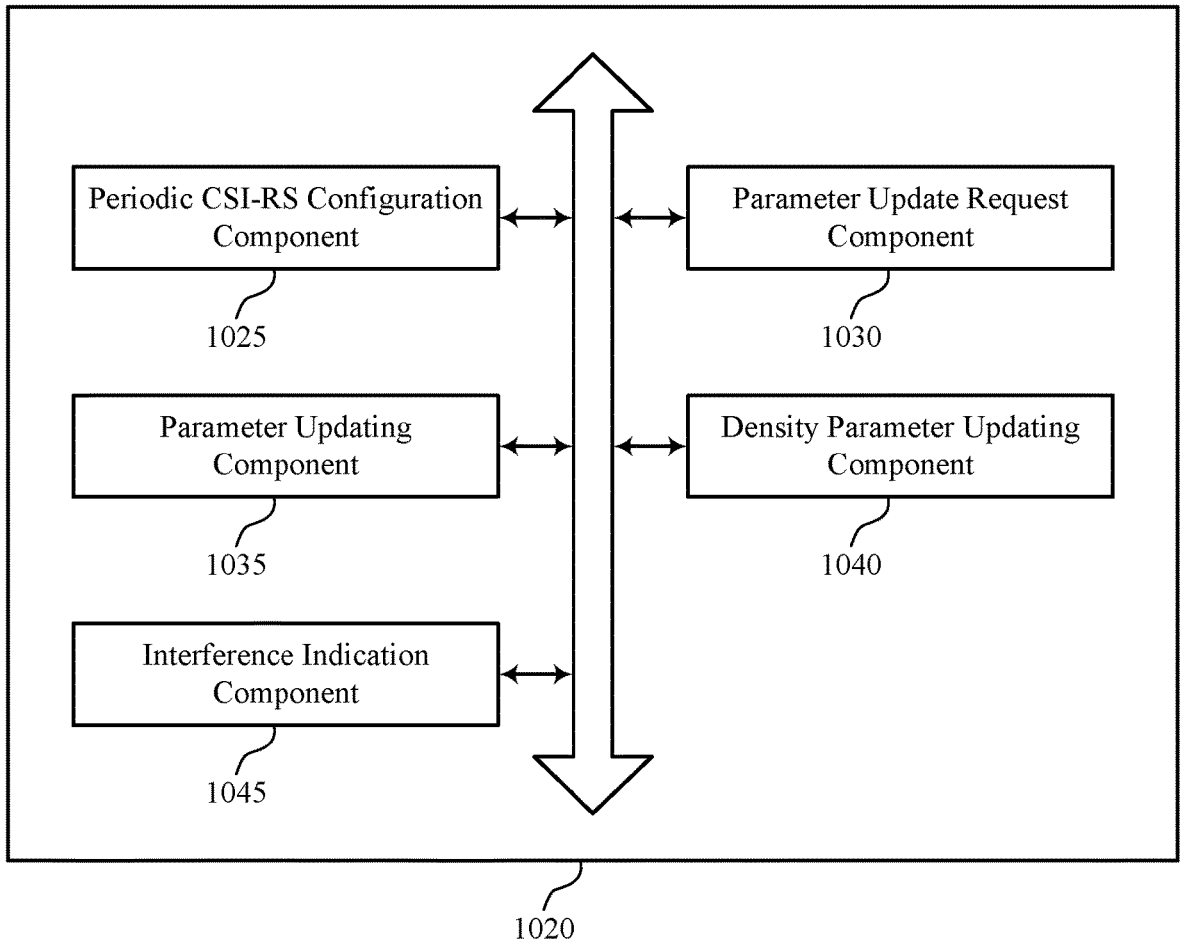
FIG. 10 shows a block diagram of a communications manager that supports techniques for reporting CSI periodicity in accordance with aspects of the present disclosure.

FIG. 10 shows a block diagram 1000 of a communications manager 1020 that supports techniques for reporting CSI periodicity in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for reporting CSI periodicity as described herein. For example, the communications manager 1020 may include a periodic CSI-RS configuration component 1025, a parameter update request component 1030, a parameter updating component 1035, a density parameter updating component 1040, an interference indication component 1045, or any combination thereof. Each of these components may communicate, directly or indirectly, with one another (e.g., via one or more buses).

The communications manager 1020 may support wireless communication at a base station in accordance with examples as disclosed herein. The periodic CSI-RS configuration component 1025 may be configured as or otherwise support a means for transmitting, to a UE, one or more CSI-RSs according to a periodic CSI-RS configuration identifying a first value for one or more parameters. The parameter update request component 1030 may be configured as or otherwise support a means for receiving, from the UE, a request to update the one or more parameters of the periodic CSI-RS configuration based on the transmitted one or more periodic CSI-RSs. The parameter updating component 1035 may be configured as or otherwise support a means for transmitting, to the UE based at least in part in response to the request, control signaling indicating a second value for the one or more parameters of the periodic CSI-RS configuration, the second value different from the first value for the one or more parameters.

In some examples, to support receiving the request to update the one or more parameters, the parameter update request component 1030 may be configured as or otherwise support a means for receiving the request to update the first value of a periodicity parameter of the one or more periodicity parameters for the periodic CSI-RS configuration, where the control signaling indicates the second value for the periodicity parameter.

In some examples, to support receiving the request to update the one or more parameters, the parameter update request component 1030 may be configured as or otherwise support a means for receiving the request to update a first periodicity parameter of the one or more periodicity parameters for the periodic CSI-RS configuration and the first value of a second periodicity parameter for the periodic CSI-RS configuration, where the control signaling indicates the second value for the first periodicity parameter and the second value for the second periodicity parameter.

In some examples, the first periodicity parameter is associated with CSI-RSs used for channel tracking, and the second periodicity parameter is associated with CSI-RSs used for interference tracking.

In some examples, to support receiving the request to update the one or more parameters, the parameter update request component 1030 may be configured as or otherwise support a means for receiving the request indicating an average periodicity for the periodic CSI-RS configuration and a variance for the average periodicity.

In some examples, the parameter update request component 1030 may be configured as or otherwise support a means for receiving the request indicating a first average periodicity associated with CSI-RSs used for channel tracking and a second average periodicity associated with CSI-RSs used for interference tracking.

In some examples, to support receiving the request to update the one or more parameters, the density parameter updating component 1040 may be configured as or otherwise support a means for receiving the request to update a reference signal density parameter of the one or more periodicity parameters for the periodic CSI-RS configuration, where the control signaling indicates the second value for the reference signal density parameter.

In some examples, the interference indication component 1045 may be configured as or otherwise support a means for receiving, from the UE, an indication of a latest slot associated with observed interference on a wireless channel between the UE and the base station.

In some examples, the interference indication component 1045 may be configured as or otherwise support a means for transmitting, to the UE, an indication of a set of multiple slots associated with observed interference on the wireless channel.

In some examples, the interference indication component 1045 may be configured as or otherwise support a means for transmitting, to the UE, an indication of a quantity of slots for observed interference reporting, where the set of multiple slots corresponds to the quantity of slots.

In some examples, to support transmitting the control signaling indicating the second value, the parameter updating component 1035 may be configured as or otherwise support a means for transmitting, in the control signaling, an indication of the second value for a periodicity for the periodic CSI-RS configuration, or a reference signal density for the periodic CSI-RS configuration, or any combination thereof.

Figure 11:
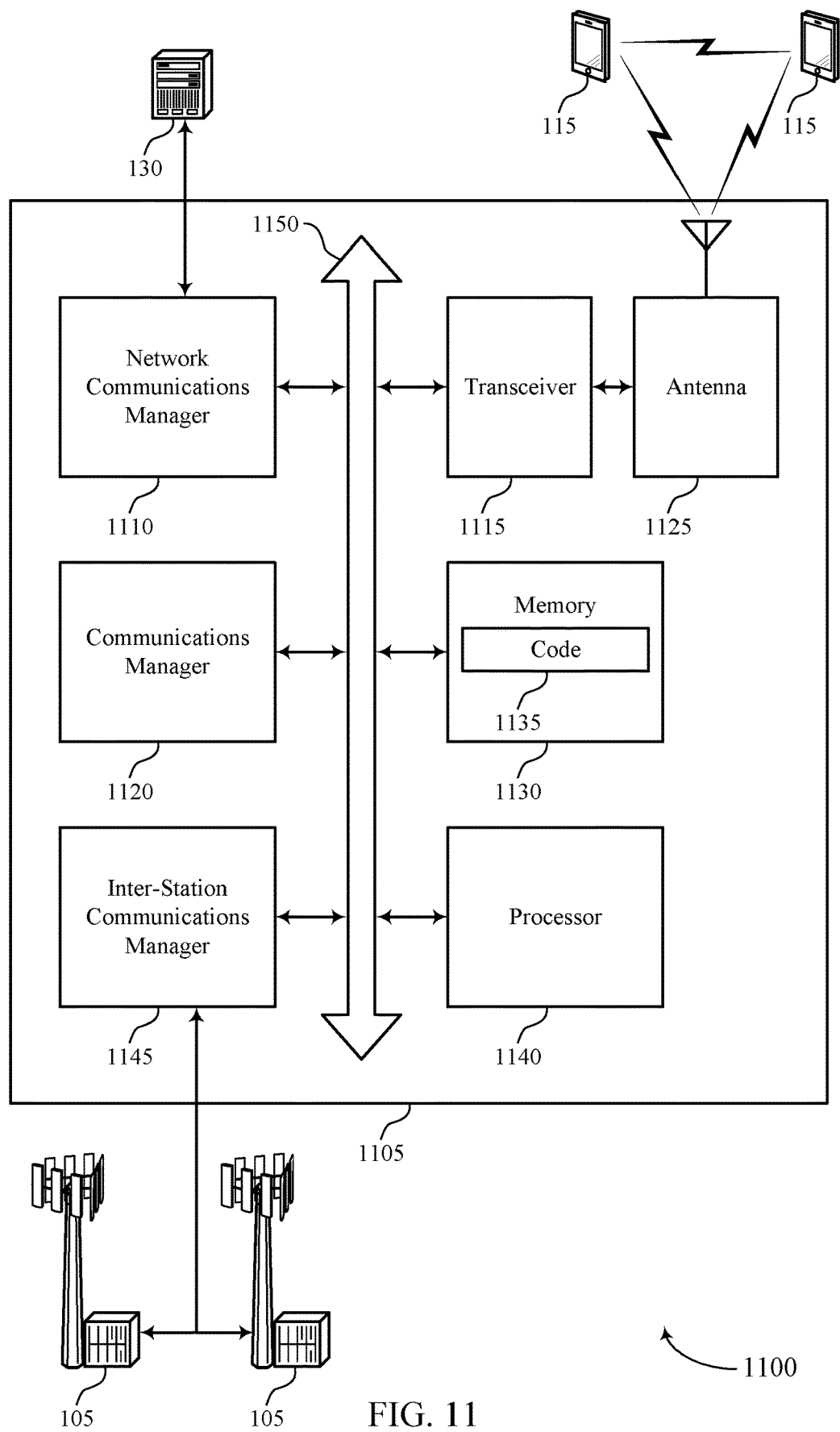
FIG. 11 shows a diagram of a system including a device that supports techniques for reporting CSI periodicity in accordance with aspects of the present disclosure.

FIG. 11 shows a diagram of a system 1100 including a device 1105 that supports techniques for reporting CSI periodicity in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for reporting CSI periodicity). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, one or more CSI-RSs according to a periodic CSI-RS configuration identifying a first value for one or more parameters. The communications manager 1120 may be configured as or otherwise support a means for receiving, from the UE, a request to update the one or more parameters of the periodic CSI-RS configuration based on the transmitted one or more periodic CSI-RSs. The communications manager 1120 may be configured as or otherwise support a means for transmitting, to the UE based at least in part in response to the request, control signaling indicating a second value for the one or more parameters of the periodic CSI-RS configuration, the second value different from the first value for the one or more parameters.

By including or configuring the communications manager 1120 in accordance with examples as described herein, the device 1105 may support techniques for improved communication reliability and more efficient utilization of communication resources, improved coordination between devices. For example, in some cases, the device 1105 may update the length of a periodicity of a periodic CSI-RS configuration, which may provide more reliable CSI if a UE 115 is in a high speed scenario or an environment with quickly varying channel conditions. In another example, the device 1105 may increase the length of the periodicity of the CSI-RS configuration, which may reduce resource utilization while still providing highly accurate CSI information, such as if the UE 115 is in a low doppler scenario or an environment with few wireless channel changes.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for reporting CSI periodicity as described herein, or the processor 1140 and the memory 1130 may be otherwise configured to perform or support such operations.

Figure 12:
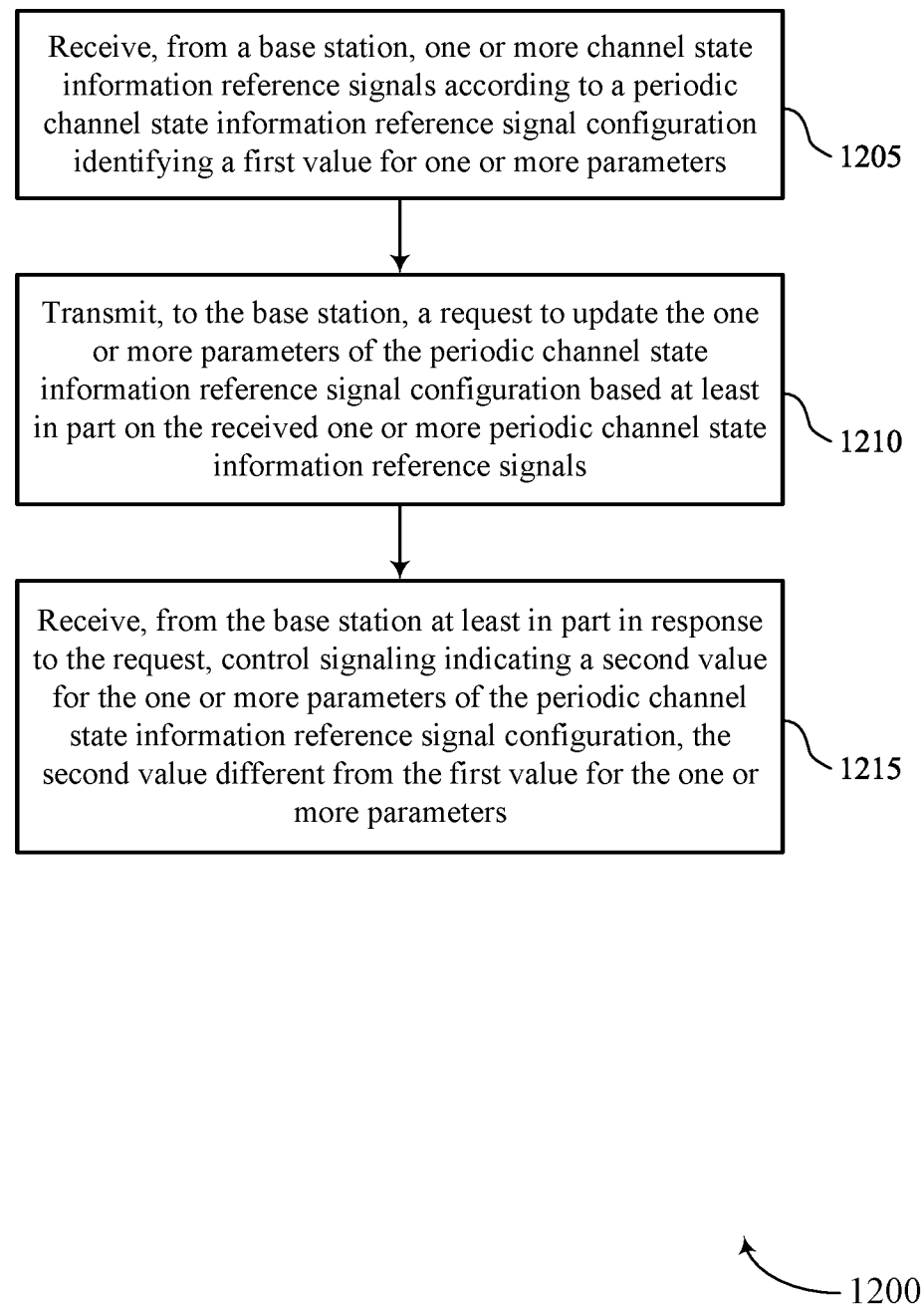
FIGS. 12 through 16 show flowcharts illustrating methods that support techniques for reporting CSI periodicity in accordance with aspects of the present disclosure.

FIG. 12 shows a flowchart illustrating a method 1200 that supports techniques for reporting CSI periodicity in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, one or more CSI-RSs according to a periodic CSI-RS configuration identifying a first value for one or more parameters. The operations of 1205 may be performed in accordance with examples as disclosed herein. In some examples, aspects of the operations of 1205 may be performed by a periodic CSI-RS configuration component 625 as described with reference to FIG. 6.

At 1210, the method may include transmitting, to the base station, a request to update the one or more parameters of the periodic CSI-RS configuration based on the received one or more periodic CSI-RSs. The operations of 1210 may be performed in accordance with examples as disclosed herein. In some examples, aspects of the operations of 1210 may be performed by a parameter update requesting component 630 as described with reference to FIG. 6.

At 1215, the method may include receiving, from the base station at least in part in response to the request, control signaling indicating a second value for the one or more parameters of the periodic CSI-RS configuration, the second value different from the first value for the one or more parameters. The operations of 1215 may be performed in accordance with examples as disclosed herein. In some examples, aspects of the operations of 1215 may be performed by a parameter update component 635 as described with reference to FIG. 6.

Figure 13:
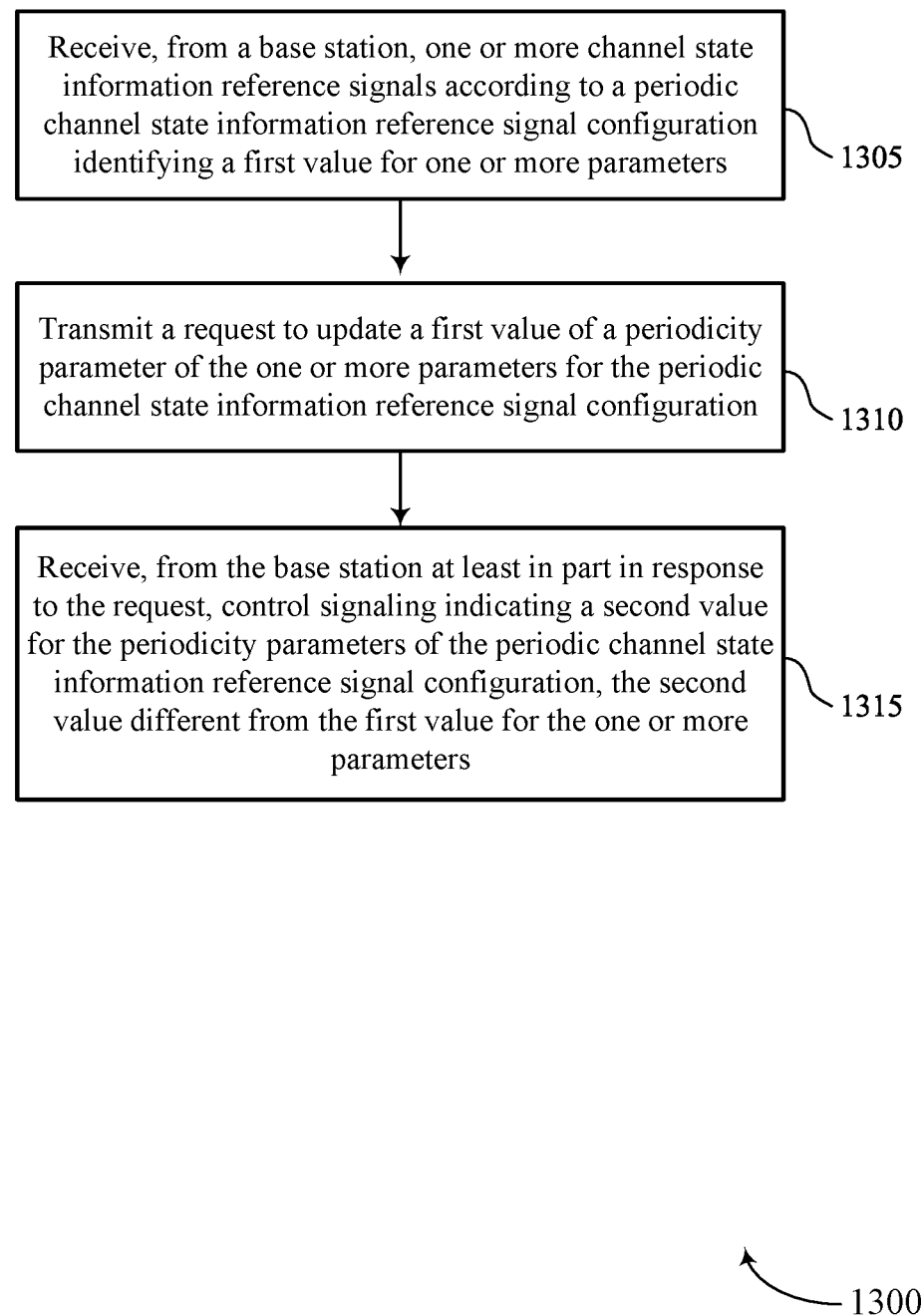

FIG. 13 shows a flowchart illustrating a method 1300 that supports techniques for reporting CSI periodicity in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, one or more CSI-RSs according to a periodic CSI-RS configuration identifying a first value for one or more parameters. The operations of 1305 may be performed in accordance with examples as disclosed herein. In some examples, aspects of the operations of 1305 may be performed by a periodic CSI-RS configuration component 625 as described with reference to FIG. 6.

At 1310, the method may include transmitting a request to update a first value of a periodicity parameter of the one or more parameters for the periodic CSI-RS configuration. The operations of 1310 may be performed in accordance with examples as disclosed herein. In some examples, aspects of the operations of 1310 may be performed by a parameter update requesting component 630 as described with reference to FIG. 6.

At 1315, the method may include receiving, from the base station in response to the request, control signaling indicating a second value for the periodicity parameter for the periodic CSI-RS configuration, where the second value differs from the first value for the one or more parameters.

The operations of 1315 may be performed in accordance with examples as disclosed herein. In some examples, aspects of the operations of 1315 may be performed by a parameter update component 635 as described with reference to FIG. 6.

Figure 14:
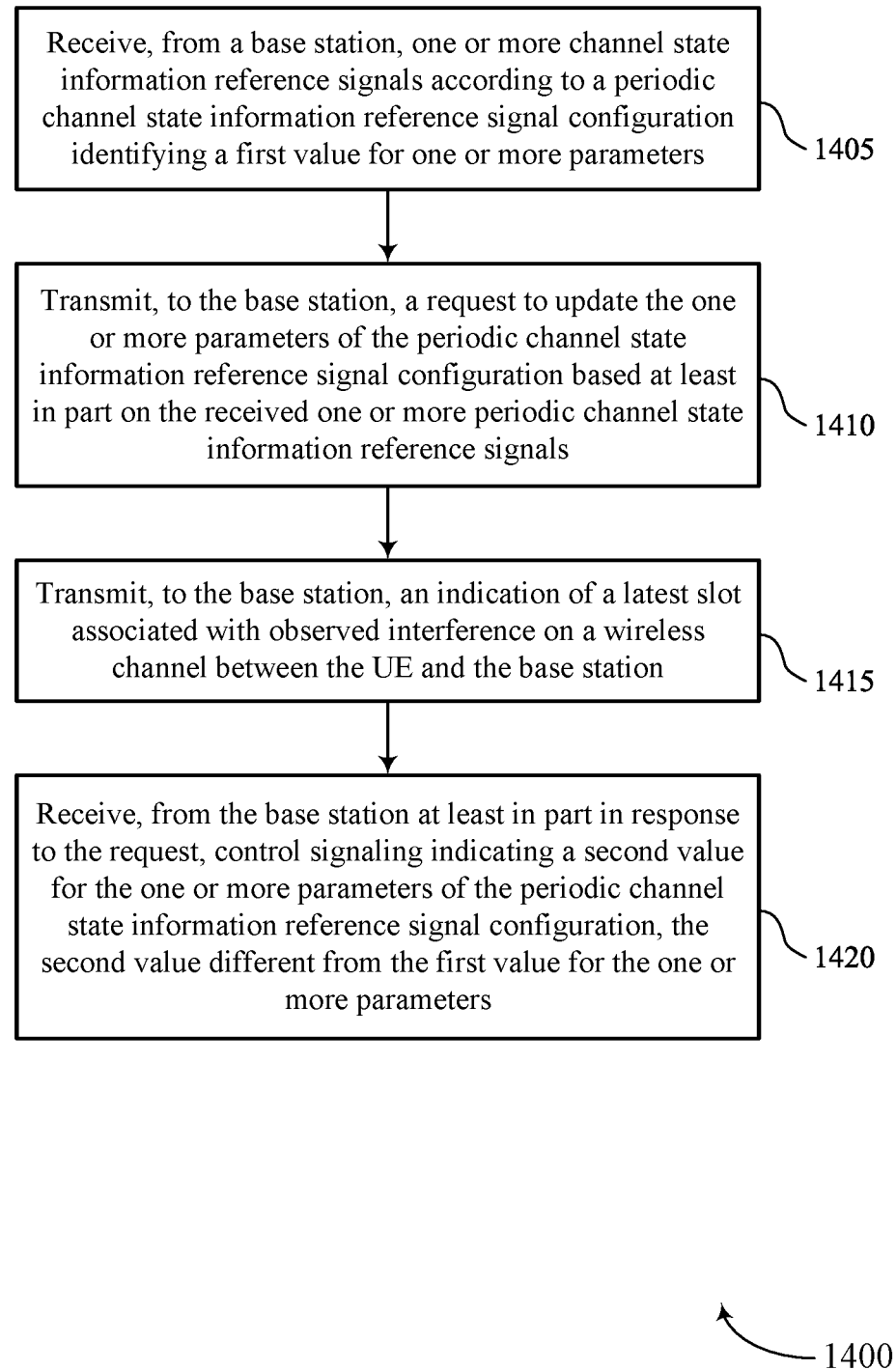

FIG. 14 shows a flowchart illustrating a method 1400 that supports techniques for reporting CSI periodicity in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, one or more CSI-RSs according to a periodic CSI-RS configuration identifying a first value for one or more parameters. The operations of 1405 may be performed in accordance with examples as disclosed herein. In some examples, aspects of the operations of 1405 may be performed by a periodic CSI-RS configuration component 625 as described with reference to FIG. 6.

At 1410, the method may include transmitting, to the base station, a request to update the one or more parameters of the periodic CSI-RS configuration based on the received one or more periodic CSI-RSs. The operations of 1410 may be performed in accordance with examples as disclosed herein. In some examples, aspects of the operations of 1410 may be performed by a parameter update requesting component 630 as described with reference to FIG. 6.

At 1415, the method may include transmitting, to the base station, an indication of a latest slot associated with observed interference on a wireless channel between the UE and the base station. The operations of 1415 may be performed in accordance with examples as disclosed herein. In some examples, aspects of the operations of 1415 may be performed by an interference detection component 650 as described with reference to FIG. 6.

At 1420, the method may include receiving, from the base station at least in part in response to the request, control signaling indicating a second value for the one or more parameters of the periodic CSI-RS configuration, the second value different from the first value for the one or more parameters. The operations of 1420 may be performed in accordance with examples as disclosed herein. In some examples, aspects of the operations of 1420 may be performed by a parameter update component 635 as described with reference to FIG. 6.

Figure 15:
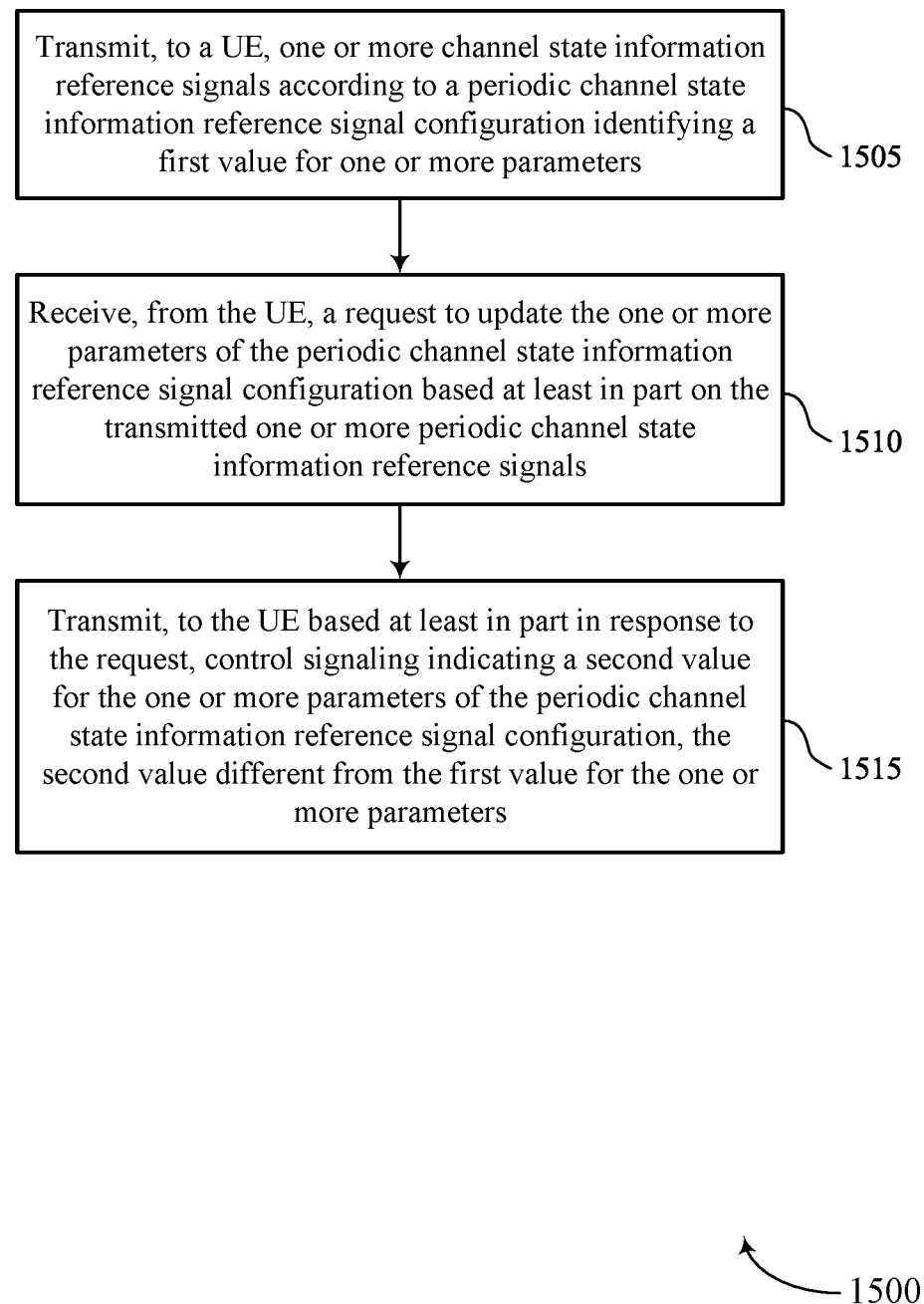

FIG. 15 shows a flowchart illustrating a method 1500 that supports techniques for reporting CSI periodicity in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, one or more CSI-RSs according to a periodic CSI-RS configuration identifying a first value for one or more parameters. The operations of 1505 may be performed in accordance with examples as disclosed herein. In some examples, aspects of the operations of 1505 may be performed by a periodic CSI-RS configuration component 1025 as described with reference to FIG. 10.

At 1510, the method may include receiving, from the UE, a request to update the one or more parameters of the periodic CSI-RS configuration based on the transmitted one or more periodic CSI-RSs. The operations of 1510 may be performed in accordance with examples as disclosed herein. In some examples, aspects of the operations of 1510 may be performed by a parameter update request component 1030 as described with reference to FIG. 10.

At 1515, the method may include transmitting, to the UE based at least in part in response to the request, control signaling indicating a second value for the one or more parameters of the periodic CSI-RS configuration, the second value different from the first value for the one or more parameters. The operations of 1515 may be performed in accordance with examples as disclosed herein. In some examples, aspects of the operations of 1515 may be performed by a parameter updating component 1035 as described with reference to FIG. 10.

Figure 16:
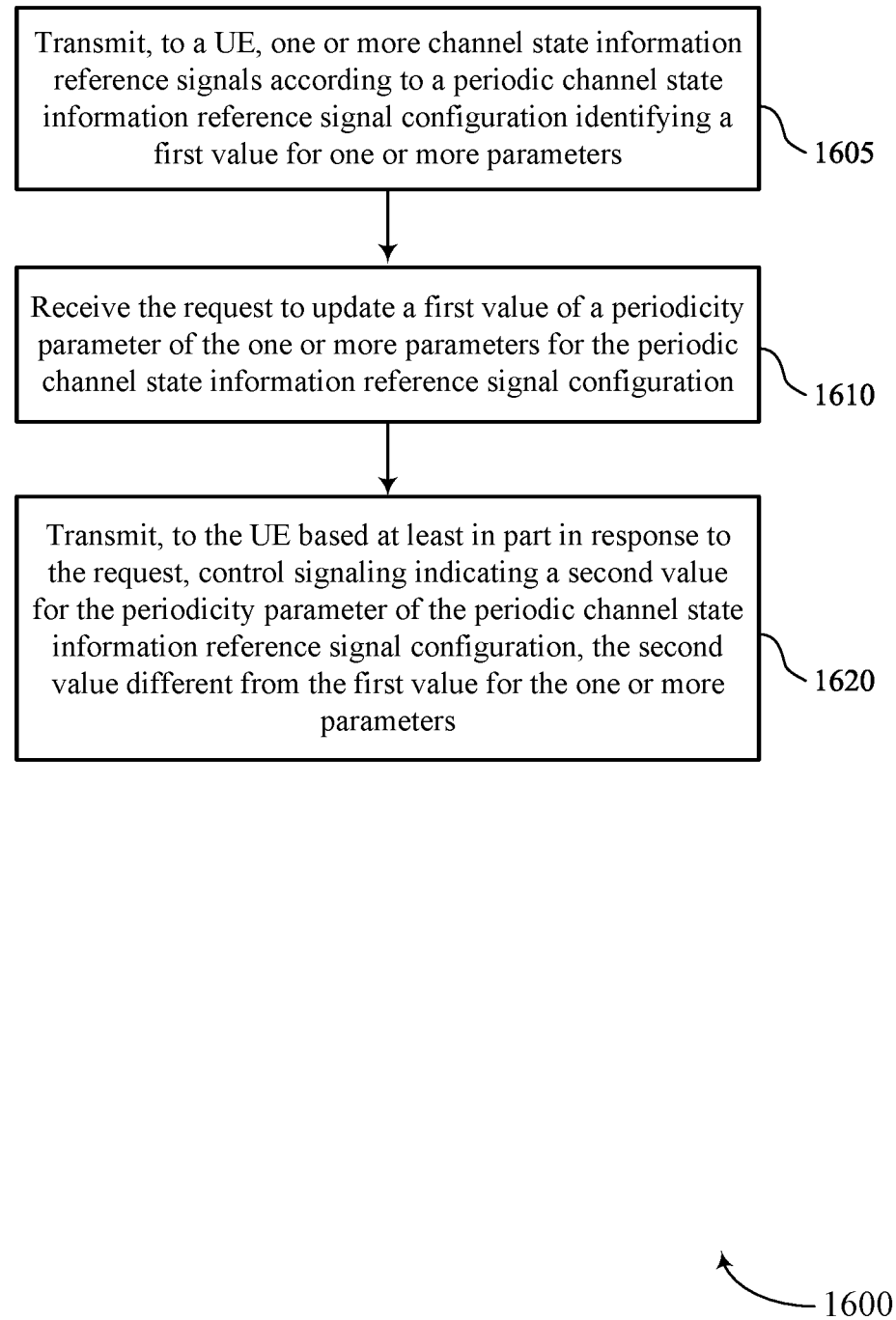

FIG. 16 shows a flowchart illustrating a method 1600 that supports techniques for reporting CSI periodicity in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, one or more CSI-RSs according to a periodic CSI-RS configuration identifying a first value for one or more parameters. The operations of 1605 may be performed in accordance with examples as disclosed herein. In some examples, aspects of the operations of 1605 may be performed by a periodic CSI-RS configuration component 1025 as described with reference to FIG. 10.

At 1610, the method may include receiving a request to update a first value of a periodicity parameter of the one or more parameters for the periodic CSI-RS configuration. The operations of 1610 may be performed in accordance with examples as disclosed herein. In some examples, aspects of the operations of 1610 may be performed by a parameter update request component 1030 as described with reference to FIG. 10.

At 1615, the method may include transmitting, to the UE based at least in part in response to the request, control signaling indicating a second value for the periodicity parameter of the periodic CSI-RS configuration, the second value different from the first value for the one or more parameters. The operations of 1615 may be performed in accordance with examples as disclosed herein. In some examples, aspects of the operations of 1615 may be performed by a parameter updating component 1035 as described with reference to FIG. 10.

The following provides an overview of aspects of the present disclosure:

Aspect 1: A method for wireless communication at a UE, comprising: receiving, from a base station, one or more channel state information reference signals according to a periodic channel state information reference signal configuration identifying a first value for one or more parameters; transmitting, to the base station, a request to update the one or more parameters of the periodic channel state information reference signal configuration based at least in part on the received one or more periodic channel state information reference signals; and receiving, from the base station at least in part in response to the request, control signaling indicating a second value for the one or more parameters of the periodic channel state information reference signal configuration, the second value different from the first value for the one or more parameters.

Aspect 2: The method of aspect 1, wherein transmitting the request to update the one or more parameters comprises: transmitting the request to update the first value of a periodicity parameter of the one or more periodicity parameters for the periodic channel state information reference signal configuration, wherein the control signaling indicates the second value for the periodicity parameter.

Aspect 3: The method of aspect 2, further comprising: determining the periodicity value based at least in part on a Doppler spread, a delay spread, a Doppler shift, channel characteristics of a wireless channel between the UE and the base station, an interference time and frequency pattern on the wireless channel, a time and frequency coherency of the wireless channel, or any combination thereof.

Aspect 4: The method of any of aspects 1 through 3, wherein transmitting the request to update the one or more parameters comprises: transmitting the request to update a first periodicity parameter of the one or more periodicity parameters for the periodic channel state information reference signal configuration and the first value of a second periodicity parameter for the periodic channel state information reference signal configuration, wherein the control signaling indicates the second value for the first periodicity parameter and the second value for the second periodicity parameter.

Aspect 5: The method of aspect 4, wherein the first periodicity parameter is associated with channel state information reference signals used for channel tracking, and the second periodicity parameter is associated with channel state information reference signals used for interference tracking.

Aspect 6: The method of any of aspects 1 through 5, wherein transmitting the request to update the one or more parameters comprises: determining, by the UE, an average periodicity for the periodic channel state information reference signal configuration and a variance for the average periodicity based at least in part on a plurality of estimated periodicities for the periodic channel state information reference signal configuration; and transmitting the request indicating the determined average periodicity and the variance for the average periodicity.

Aspect 7: The method of aspect 6, further comprising: determining a first average periodicity associated with channel state information reference signals used for channel tracking and a second average periodicity associated with channel state information reference signals used for interference tracking.

Aspect 8: The method of any of aspects 1 through 7, wherein transmitting the request to update the one or more parameters comprises: transmitting the request to update a reference signal density parameter of the one or more periodicity parameters for the periodic channel state information reference signal configuration, wherein the control signaling indicates the second value for the reference signal density parameter.

Aspect 9: The method of aspect 8, further comprising: determining, by the UE, the reference signal density based at least in part on a Doppler spread, a delay spread, a Doppler shift, channel characteristics of a wireless channel between the UE and the base station, an interference time and frequency pattern on the wireless channel, a time and frequency coherency of the wireless channel, or any combination thereof.

Aspect 10: The method of any of aspects 1 through 9, further comprising: transmitting, to the base station, an indication of a latest slot associated with observed interference on a wireless channel between the UE and the base station.

Aspect 11: The method of any of aspects 1 through 10, further comprising: transmitting an indication of a plurality of slots associated with observed interference on the wireless channel.

Aspect 12: The method of aspect 11, further comprising: receiving, from the base station, an indication of a quantity of slots for observed interference reporting, wherein the plurality of slots corresponds to the quantity of slots.

Aspect 13: The method of any of aspects 1 through 12, wherein receiving the control signaling indicating the second value comprises: receiving, in the control signaling, an indication of the second value for a periodicity for the periodic channel state information reference signal configuration, or a reference signal density for the periodic channel state information reference signal configuration, or any combination thereof.

Aspect 14: A method for wireless communication at a base station, comprising: transmitting, to a UE, one or more channel state information reference signals according to a periodic channel state information reference signal configuration identifying a first value for one or more parameters; receiving, from the UE, a request to update the one or more parameters of the periodic channel state information reference signal configuration based at least in part on the transmitted one or more periodic channel state information reference signals; and transmitting, to the UE based at least in part in response to the request, control signaling indicating a second value for the one or more parameters of the periodic channel state information reference signal configuration, the second value different from the first value for the one or more parameters.

Aspect 15: The method of aspect 14, wherein receiving the request to update the one or more parameters comprises: receiving the request to update the first value of a periodicity parameter of the one or more periodicity parameters for the periodic channel state information reference signal configuration, wherein the control signaling indicates the second value for the periodicity parameter.

Aspect 16: The method of any of aspects 14 through 15, wherein receiving the request to update the one or more parameters comprises: receiving the request to update a first periodicity parameter of the one or more periodicity parameters for the periodic channel state information reference signal configuration and the first value of a second periodicity parameter for the periodic channel state information reference signal configuration, wherein the control signaling indicates the second value for the first periodicity parameter and the second value for the second periodicity parameter.

Aspect 17: The method of aspect 16, wherein the first periodicity parameter is associated with channel state information reference signals used for channel tracking, and the second periodicity parameter is associated with channel state information reference signals used for interference tracking.

Aspect 18: The method of any of aspects 14 through 17, wherein receiving the request to update the one or more parameters comprises: receiving the request indicating an average periodicity for the periodic channel state information reference signal configuration and a variance for the average periodicity.

Aspect 19: The method of aspect 18, further comprising: receiving the request indicating a first average periodicity associated with channel state information reference signals used for channel tracking and a second average periodicity associated with channel state information reference signals used for interference tracking.

Aspect 20: The method of any of aspects 14 through 19, wherein receiving the request to update the one or more parameters comprises: receiving the request to update a reference signal density parameter of the one or more periodicity parameters for the periodic channel state information reference signal configuration, wherein the control signaling indicates the second value for the reference signal density parameter.

Aspect 21: The method of any of aspects 14 through 20, further comprising: receiving, from the UE, an indication of a latest slot associated with observed interference on a wireless channel between the UE and the base station.

Aspect 22: The method of any of aspects 14 through 21, further comprising: transmitting, to the UE, an indication of a plurality of slots associated with observed interference on the wireless channel.

Aspect 23: The method of aspect 22, further comprising: transmitting, to the UE, an indication of a quantity of slots for observed interference reporting, wherein the plurality of slots corresponds to the quantity of slots.

Aspect 24: The method of any of aspects 14 through 23, wherein transmitting the control signaling indicating the second value comprises: transmitting, in the control signaling, an indication of the second value for a periodicity for the periodic channel state information reference signal configuration, or a reference signal density for the periodic channel state information reference signal configuration, or any combination thereof.

Aspect 25: An apparatus for wireless communication at a UE, comprising a processor; memory coupled with the processor; and instructions stored in the memory and executable by the processor to cause the apparatus to perform a method of any of aspects 1 through 13.

Aspect 26: An apparatus for wireless communication at a UE, comprising at least one means for performing a method of any of aspects 1 through 13.

Aspect 27: A non-transitory computer-readable medium storing code for wireless communication at a UE, the code comprising instructions executable by a processor to perform a method of any of aspects 1 through 13.

Aspect 28: An apparatus for wireless communication at a base station, comprising a processor; memory coupled with the processor; and instructions stored in the memory and executable by the processor to cause the apparatus to perform a method of any of aspects 14 through 24.

Aspect 29: An apparatus for wireless communication at a base station, comprising at least one means for performing a method of any of aspects 14 through 24.

Aspect 30: A non-transitory computer-readable medium storing code for wireless communication at a base station, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network device, one or more channel state information reference signals according to a periodic channel state information reference signal configuration identifying a first value for one or more parameters;
   transmitting, to the network device, a request to update the first value of a periodicity parameter of the one or more parameters of the periodic channel state information reference signal configuration based at least in part on the one or more channel state information reference signals; and
   receiving, from the network device in response to the request, control signaling indicating a second value for the one or more parameters of the periodic channel state information reference signal configuration, the second value being different from the first value, wherein the second value is for the periodicity parameter or a reference signal density parameter, or both.

2. The method of claim 1, wherein transmitting the request to update the one or more parameters comprises:
   wherein the control signaling indicates the second value for the periodicity parameter.

3. The method of claim 2,
   wherein the second value for the periodicity parameter is based at least in part on a Doppler spread, a delay spread, a Doppler shift, channel characteristics of a wireless channel between the UE and the network device, an interference time and frequency pattern on the wireless channel, a time and frequency coherency of the wireless channel, or any combination thereof.

4. The method of claim 1, wherein transmitting the request to update the one or more parameters comprises:
   transmitting the request to update a first periodicity parameter of the one or more parameters for the periodic channel state information reference signal configuration and the first value of a second periodicity parameter for the periodic channel state information reference signal configuration, wherein the control signaling indicates the second value for the first periodicity parameter and the second value for the second periodicity parameter.

5. The method of claim 4, wherein the first periodicity parameter is associated with channel state information reference signals used for channel tracking, and the second periodicity parameter is associated with channel state information reference signals used for interference tracking.

6. The method of claim 1, wherein transmitting the request to update the one or more parameters comprises:
   determining, by the UE, an average periodicity for the periodic channel state information reference signal configuration and a variance for the average periodicity based at least in part on a plurality of estimated periodicities for the periodic channel state information reference signal configuration; and
   transmitting the request indicating the average periodicity and the variance for the average periodicity.

7. The method of claim 6, further comprising:
   determining a first average periodicity associated with channel state information reference signals used for channel tracking and a second average periodicity associated with channel state information reference signals used for interference tracking.

8. The method of claim 1, wherein transmitting the request to update the one or more parameters comprises:
transmitting the request to update the reference signal density parameter of the one or more parameters for the periodic channel state information reference signal configuration, wherein the control signaling indicates the second value for the reference signal density parameter.

9. The method of claim 8, further comprising:
determining, by the UE, the reference signal density parameter based at least in part on a Doppler spread, a delay spread, a Doppler shift, channel characteristics of a wireless channel between the UE and the network device, an interference time and frequency pattern on the wireless channel, a time and frequency coherency of the wireless channel, or any combination thereof.

10. The method of claim 1, further comprising:
transmitting, to the network device, an indication of a latest slot associated with observed interference on a wireless channel between the UE and the network device.

11. The method of claim 1, further comprising:
transmitting an indication of a plurality of slots associated with observed interference on a wireless channel between the UE and the network device.

12. The method of claim 11, further comprising:
receiving, from the network device, an indication of a quantity of slots for observed interference reporting, wherein the plurality of slots corresponds to the quantity of slots.

13. A method for wireless communication at a network device, comprising:
transmitting, to a user equipment (UE), one or more channel state information reference signals according to a periodic channel state information reference signal configuration identifying a first value for one or more parameters;
receiving, from the UE, a request to update the first value of the periodicity parameter of the one or more parameters of the periodic channel state information reference signal configuration based at least in part on the one or more channel state information reference signals; and
transmitting, to the UE in response to the request, control signaling indicating a second value for the one or more parameters of the periodic channel state information reference signal configuration, the second value being different from the first value, wherein the second value is for a periodicity parameter or a reference signal density parameter, or both.

14. The method of claim 13, wherein receiving the request to update the one or more parameters comprises:
wherein the control signaling indicates the second value for the periodicity parameter.

15. The method of claim 13, wherein receiving the request to update the one or more parameters comprises:
receiving the request to update a first periodicity parameter of the one or more parameters for the periodic channel state information reference signal configuration and the first value of a second periodicity parameter for the periodic channel state information reference signal configuration, wherein the control signaling indicates the second value for the first periodicity parameter and the second value for the second periodicity parameter.

16. The method of claim 15, wherein the first periodicity parameter is associated with channel state information reference signals used for channel tracking, and the second periodicity parameter is associated with channel state information reference signals used for interference tracking.

17. The method of claim 13, wherein receiving the request to update the one or more parameters comprises:
receiving the request indicating an average periodicity for the periodic channel state information reference signal configuration and a variance for the average periodicity.

18. The method of claim 17, further comprising:
receiving the request indicating a first average periodicity associated with channel state information reference signals used for channel tracking and a second average periodicity associated with channel state information reference signals used for interference tracking.

19. The method of claim 13, wherein receiving the request to update the one or more parameters comprises:
receiving the request to update the reference signal density parameter of the one or more parameters for the periodic channel state information reference signal configuration, wherein the control signaling indicates the second value for the reference signal density parameter.

20. The method of claim 13, further comprising:
receiving, from the UE, an indication of a latest slot associated with observed interference on a wireless channel between the UE and the network device.

21. The method of claim 13, further comprising:
transmitting, to the UE, an indication of a plurality of slots associated with observed interference on a wireless channel between the UE and the network device.

22. The method of claim 21, further comprising:
transmitting, to the UE, an indication of a quantity of slots for observed interference reporting, wherein the plurality of slots corresponds to the quantity of slots.

23. An apparatus for wireless communication at a user equipment (UE), comprising:
a processor;
memory coupled with the processor and with instructions stored in the memory and executable by the processor to cause the apparatus to:
receive, from a network device, one or more channel state information reference signals according to a periodic channel state information reference signal configuration identifying a first value for one or more parameters;
transmit, to the network device, a request to update the first value of the periodicity parameter of the one or more parameters of the periodic channel state information reference signal configuration based at least in part on the one or more channel state information reference signals; and
receive, from the network device in response to the request, control signaling indicating a second value for the one or more parameters of the periodic channel state information reference signal configuration, the second value being different from the first value, wherein the second value is for a periodicity parameter or a reference signal density parameter, or both.

24. The apparatus of claim 23, wherein the control signaling indicates the second value for the periodicity parameter.

25. The apparatus of claim 24, wherein
the second value for the periodicity parameter is based at least in part on a Doppler spread, a delay spread, a Doppler shift, channel characteristics of a wireless channel between the UE and the network device, an interference time and frequency pattern on the wireless channel, a time and frequency coherency of the wireless channel, or any combination thereof.

26. The apparatus of claim 23, wherein the instructions to transmit the request to update the one or more parameters are executable by the processor to cause the apparatus to:
transmit the request to update a first periodicity parameter of the one or more parameters for the periodic channel state information reference signal configuration and the first value of a second periodicity parameter for the periodic channel state information reference signal configuration, wherein the control signaling indicates the second value for the first periodicity parameter and the second value for the second periodicity parameter.

27. The apparatus of claim 26, wherein the first periodicity parameter is associated with channel state information reference signals used for channel tracking, and the second periodicity parameter is associated with channel state information reference signals used for interference tracking.

28. An apparatus for wireless communication at a network device, comprising:
a processor;
memory coupled with the processor and with instructions stored in the memory and executable by the processor to cause the apparatus to:
transmit, to a user equipment (UE), one or more channel state information reference signals according to a periodic channel state information reference signal configuration identifying a first value for one or more parameters;
receive, from the UE, a request to update the first value of the periodicity parameter of the one or more parameters of the periodic channel state information reference signal configuration based at least in part on the one or more channel state information reference signals; and
transmit, to the UE in response to the request, control signaling indicating a second value for the one or more parameters of the periodic channel state information reference signal configuration, the second value being different from the first value, wherein the second value is for a periodicity parameter or a reference signal density parameter, or both.

* * * * *